US012800130B2

(12) United States Patent
Strommen et al.

(10) Patent No.: US 12,800,130 B2
(45) Date of Patent: Nov. 17, 2026

(54) TASK LIGHT WITH A PAIR OF CONNECTABLE LEGS

(71) Applicant: MILWAUKEE ELECTRIC TOOL CORPORATION, Brookfield, WI (US)

(72) Inventors: Matthew D. Strommen, Greendale, WI (US); Chelsea L. Rubietta, Oak Creek, WI (US); Brian A. Foster, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/903,727

(22) Filed: Oct. 1, 2024

(65) Prior Publication Data

US 2025/0137619 A1 May 1, 2025

Related U.S. Application Data

(60) Provisional application No. 63/567,663, filed on Mar. 20, 2024, provisional application No. 63/594,735, filed on Oct. 31, 2023.

(51) Int. Cl.
*F21V 17/10* (2006.01)
*F21L 4/04* (2006.01)
(Continued)

(52) U.S. Cl.
CPC .............. *F21V 17/105* (2013.01); *F21L 4/04* (2013.01); *F21L 4/08* (2013.01); *F21V 21/30* (2013.01);
(Continued)

(58) Field of Classification Search
CPC ........ F21V 17/105; F21V 21/06; F21V 21/30; F21L 4/04; F16M 11/242
See application file for complete search history.

(56) References Cited

U.S. PATENT DOCUMENTS

| | | | |
|---|---|---|---|
| 6,022,119 | A | 2/2000 | Booty, Jr. |
| 6,585,400 | B2 | 7/2003 | Leen |

(Continued)

FOREIGN PATENT DOCUMENTS

| | | | |
|---|---|---|---|
| CN | 204213654 | U | 3/2015 |
| CN | 204477884 | U | 7/2015 |

(Continued)

OTHER PUBLICATIONS

Klein Tools 56403 LED Light , 2019, https://www.amazon.com/Klein-Tools-56403-Rechargeable-Illumination/dp/B07V4FTX6C/ (Year: 2019).*

(Continued)

*Primary Examiner* — James R Greece
*Assistant Examiner* — Michael Chiang
(74) *Attorney, Agent, or Firm* — Michael Best & Friedrich LLP

(57) ABSTRACT

A lighting device includes a connector body defining a first axis and a second axis, and a light head rotatably coupled to the connector body for rotation about the first axis. The light head includes a housing and a light source supported by the housing. The lighting device also includes a first leg rotatably coupled to the connector body for rotation about the second axis. The first leg extends to a first distal end. The lighting device also includes a second leg rotatably coupled to the connector body for rotation about the second axis independent from the first leg. The second leg extends to a second distal end. The first distal end of the first leg removably engages the second distal end of the second leg. The first leg and the second leg are configurable to support the light head.

18 Claims, 24 Drawing Sheets

(51) Int. Cl.

| | |
|---|---|
| ***F21L 4/08*** | (2006.01) |
| ***F21V 21/30*** | (2006.01) |
| *F21V 21/088* | (2006.01) |
| *F21V 21/096* | (2006.01) |
| *F21V 21/14* | (2006.01) |

(52) U.S. Cl.

CPC ............... *F21L 4/045* (2013.01); *F21L 4/085* (2013.01); *F21V 21/0885* (2013.01); *F21V 21/0965* (2013.01); *F21V 21/145* (2013.01)

(56) References Cited

U.S. PATENT DOCUMENTS

| | | | | |
|---|---|---|---|---|
| 6,729,739 | B2 | 5/2004 | Siegel et al. | |
| D498,551 | S | 11/2004 | Chan | |
| 7,152,997 | B1 | 12/2006 | Kovacik et al. | |
| 7,717,586 | B2 | 5/2010 | Tucker | |
| D636,915 | S | 4/2011 | Bryant et al. | |
| 7,918,585 | B2 | 4/2011 | Tucker | |
| 7,954,980 | B2 | 6/2011 | Bryant et al. | |
| D665,522 | S | 8/2012 | Werner et al. | |
| 8,303,142 | B2 | 11/2012 | Bryant et al. | |
| 8,348,483 | B2 | 1/2013 | Lin | |
| D679,846 | S | 4/2013 | Bryant et al. | |
| 8,430,529 | B2 | 4/2013 | Christ et al. | |
| D695,434 | S | 12/2013 | Shen | |
| D698,471 | S | 1/2014 | Poon | |
| 8,721,120 | B2 | 5/2014 | Christ et al. | |
| D710,527 | S | 8/2014 | Brown et al. | |
| 8,840,264 | B2 | 9/2014 | Molina et al. | |
| 9,046,231 | B2 | 6/2015 | Christ et al. | |
| 9,316,384 | B2 | 4/2016 | Mumma et al. | |
| D772,460 | S | 11/2016 | Saboo | |
| D776,321 | S | 1/2017 | Saboo | |
| D779,094 | S | 2/2017 | Xu et al. | |
| D799,094 | S | 10/2017 | Li | |
| D800,939 | S | 10/2017 | Cai | |
| D819,245 | S | 5/2018 | Garza | |
| 10,001,252 | B2 | 6/2018 | Inskeep | |
| 10,041,661 | B2 | 8/2018 | Garza | |
| 10,072,829 | B1 | 9/2018 | Christ et al. | |
| D855,233 | S | 7/2019 | Qiu | |
| D855,234 | S | 7/2019 | Qiu | |
| 10,352,537 | B2 | 7/2019 | Li | |
| 10,393,326 | B2 | 8/2019 | Inskeep | |
| 10,400,962 | B2 | 9/2019 | Keller | |
| 10,571,102 | B1 | 2/2020 | Bao | |
| D882,838 | S | 4/2020 | Mao | |
| D896,417 | S | 9/2020 | Huang | |
| D896,425 | S | 9/2020 | Saboo | |
| 10,935,223 | B2 | 3/2021 | Gall et al. | |
| 10,948,166 | B2 | 3/2021 | Ohara et al. | |
| 10,962,180 | B2 | 3/2021 | Cacciabeve | |
| D927,752 | S | 8/2021 | Mao | |
| D930,206 | S | 9/2021 | Sharrah et al. | |
| D930,215 | S | 9/2021 | Qiu | |
| 11,125,421 | B2 | 9/2021 | Cacciabeve | |
| 11,236,892 | B2 * | 2/2022 | Sharrah .................. | F21L 4/027 |
| 11,255,525 | B2 | 2/2022 | Sergyeyenko et al. | |
| D956,308 | S | 6/2022 | Yang | |
| 11,448,372 | B2 | 9/2022 | Wenzel et al. | |
| D984,003 | S | 4/2023 | Lu | |
| D984,699 | S | 4/2023 | Yang | |
| D1,007,021 | S * | 12/2023 | Insley ............................ | D26/37 |
| 12,196,380 | B2 | 1/2025 | Wang et al. | |
| D1,127,250 | S | 5/2026 | Sun | |
| D1,128,143 | S | 5/2026 | Zhu | |
| 2003/0078104 | A1 | 4/2003 | Lee | |
| 2005/0094385 | A1 | 5/2005 | Lee | |
| 2010/0033960 | A1 | 2/2010 | Levine | |
| 2010/0110700 | A1 | 5/2010 | Chien | |
| 2012/0033412 | A1 | 2/2012 | Molina et al. | |
| 2014/0126192 | A1 | 5/2014 | Ancona et al. | |
| 2015/0192243 | A1* | 7/2015 | Sharrah ..................... | F21L 4/00<br>362/190 |
| 2016/0265754 | A1* | 9/2016 | Sun ......................... | F21V 21/08 |
| 2018/0202617 | A1 | 7/2018 | Zhu | |
| 2018/0224077 | A1 | 8/2018 | Bian | |
| 2018/0283623 | A1 | 10/2018 | Bian | |
| 2018/0283624 | A1 | 10/2018 | Bian | |
| 2019/0234587 | A1* | 8/2019 | Ohara ................... | F21V 21/406 |
| 2019/0353332 | A1 | 11/2019 | You | |
| 2020/0300446 | A1* | 9/2020 | Sergyeyenko ............ | F21L 4/04 |
| 2020/0309355 | A1* | 10/2020 | Cacciabeve ........... | F21V 21/088 |
| 2023/0352951 | A1* | 11/2023 | Li ............................. | B25F 5/00 |
| 2023/0392760 | A1* | 12/2023 | Wang ...................... | F21V 21/30 |

FOREIGN PATENT DOCUMENTS

| | | | |
|---|---|---|---|
| CN | 204962543 | U | 1/2016 |
| CN | 205137298 | U | 4/2016 |
| CN | 205316209 | U | 6/2016 |
| CN | 207018883 | U | 2/2018 |
| CN | 208011536 | U | 10/2018 |
| CN | 210567875 | U | 5/2020 |
| CN | 112128678 | A | 12/2020 |
| CN | 308795373 | | 8/2024 |
| CN | 309174402 | | 3/2025 |
| EP | 3691231 | A1 | 8/2020 |
| WO | 2013188275 | A1 | 12/2013 |
| WO | 2018180412 | A1 | 10/2018 |

OTHER PUBLICATIONS

Milwaukee Electric Tool Corp., "Milwaukee Electric—Low-Profile Magnetic Task Light," <https://www.amazon.com/dp/B0DCCLLYHP> web page available as early as May 28, 2025, web page visited Sep. 26, 2025 (7 pages).

Yiamia, "Rechargeable LED Magnetic Work Light 2 Pack, Portable Tool Gifts for Men, 7 Flashlight Modes with Kickstand and Carabiner, 360° Rotating Head and USB Charging for Camping, Hunting, and Car Repairs," <https://www.amazon.com/dp/B0BYSXSDKT> web page available as early as May 28, 2025, web page visited Sep. 26, 2025 (9 pages).

LUTEC, "LUTEC Rechargeable Work Light, 1000 Lumens LED Magnetic Light with Magnetic Base and Hanging Hook, 360° Rotate and 200° Swivel for Car Repair, Emergency and Camping (Orange)," <https://www.amazon.com/dp/BOD2VTQ96T?th=1> web page publicly available as early as May 26, 2026 (9 pages).

Sunrei, "Sunrei Led Rechargeable Magnetic Work Lights COB Mechanic Lights, 1500 Lumens, Magnetic Base & Hanging, 7Mode, 10400mAh Magnetic Flashlight Job Site & Security for Car Repair, Emergency, Gift for Men," <https://www.amazon.com/dp/B0G4W8GYHK?th=1> web page publicly available as early as May 26, 2026 (10 pages).

* cited by examiner

TASK LIGHT WITH A PAIR OF CONNECTABLE LEGS

CROSS REFERENCE TO RELATED APPLICATIONS

This application claims priority to U.S. Provisional Patent Application No. 63/594,735, filed Oct. 31, 2023, and to U.S. Provisional Patent Application No. 63/567,663, filed Mar. 20, 2024, the entire contents of each of which are fully incorporated herein.

FIELD OF INVENTION

The present invention relates to portable lights and, more particularly, to lights for illuminating an area of a task.

SUMMARY

Embodiments described herein provide an adjustable task light configured to be placed on a support surface or mounted to a support to provide illumination to an area adjacent the task light. The adjustable task light has a light head and a support frame, and the light head is rotatable about two axes relative to the support frame.

In some aspects, the techniques described herein relate to a lighting device including a connector body defining a first axis and a second axis; a light head rotatably coupled to the connector body for rotation about the first axis, the light head including a housing and a light source supported by the housing; a first leg rotatably coupled to the connector body for rotation about the second axis, the first leg extending to a first distal end; and a second leg rotatably coupled to the connector body for rotation about the second axis independent from the first leg, the second leg extending to a second distal end; wherein the first distal end of the first leg removably engages the second distal end of the second leg, and wherein the first leg and the second leg are configurable to support the light head.

In some aspects, the techniques described herein relate to a lighting device including a light head including a housing and a light source; and a support frame rotatably coupled to the light head and configured to support the light head, the support frame including a first leg extending to a first distal end, a second leg extending to a second distal end, the second distal end being removably coupled to the first distal end, and a receiving area defined between the first leg and the second leg; wherein in a first configuration, the light head is positioned in the receiving area, and in a second configuration, the receiving area is configured to receive a support structure.

In some aspects, the techniques described herein relate to a lighting device including a connector body defining a first axis and a second axis; a light head coupled to the connector body for rotation about the first axis, the light head including a housing and a light source supported by the housing; and a support frame coupled to the connector body for rotation about the second axis, the support frame configured to support the light head and defining a receiving area; wherein the light head is rotatable relative to the support frame between a first position, in which the light head is positioned in the receiving area, and a second position, in which the light head is moved out of the receiving area.

Other aspects will become apparent by consideration of the detailed description and accompanying drawings.

DETAILED DESCRIPTION

Figure 1:
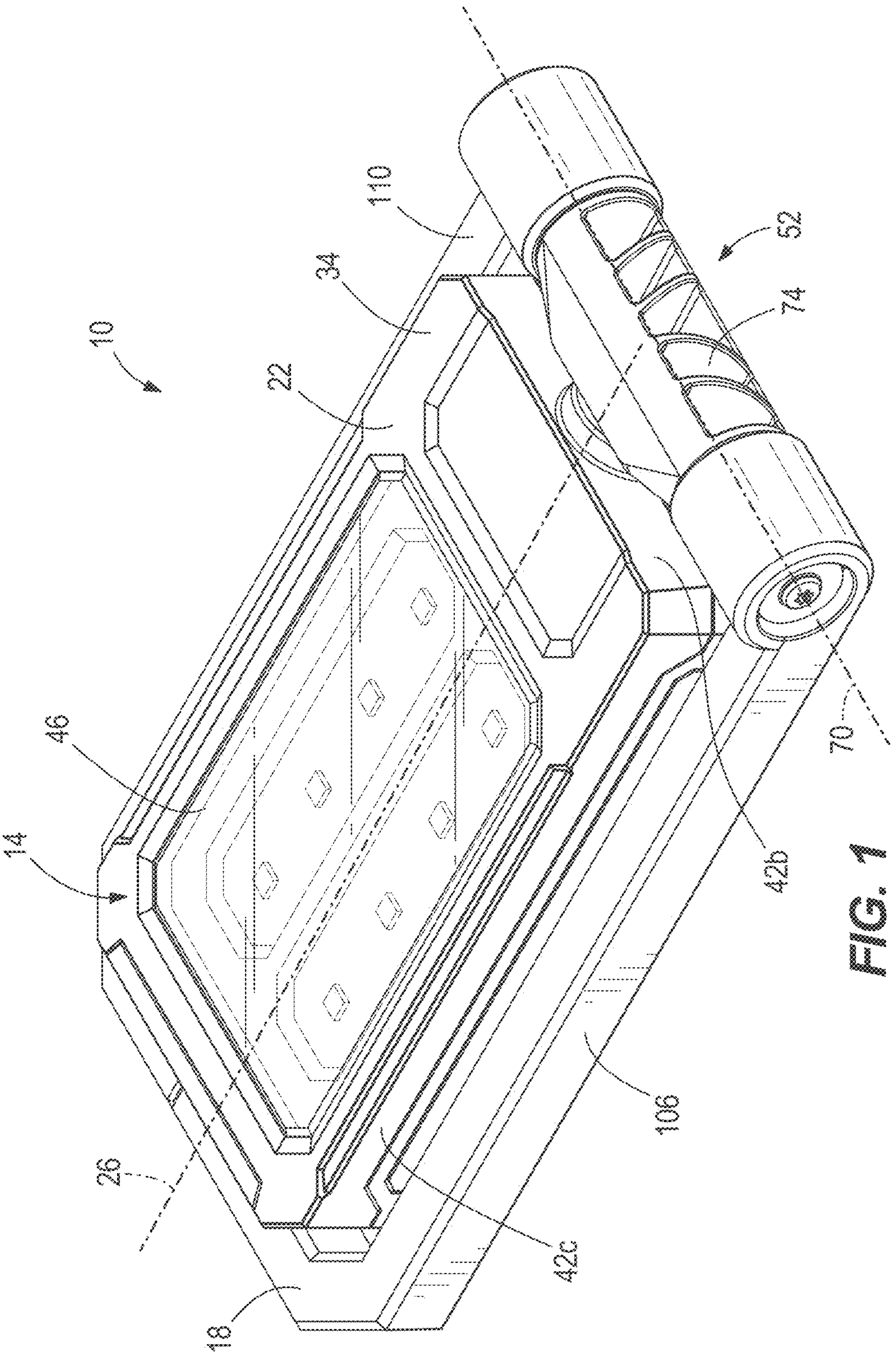
FIG. 1 is a perspective view of a first embodiment of a task light in a compact configuration, the task light including a light head and a support frame having a pair of legs.

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mountings, connections, and couplings. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

FIGS. 1-18 illustrate a first embodiment of a lighting device or task light 10. The task light 10 includes a light head 14 and a support frame 18 movably coupled to the light head 14 to support the light head 14 relative to a support structure. The light head 14 is movably coupled to the support frame 18 by a joint 52, and the task light 10 is movable between a plurality of configurations including a compact position (FIG. 1) and extended positions (FIGS. 2, 5, 6, and 7). In the illustrated embodiment, the joint 52 is a biaxial joint (also known as a universal joint) and the light head 14 is rotatable relative to the support frame 18 about a first axis 26 and pivotable relative to the support frame 18 about a second axis 70. The first axis 26 is angled relative to the second axis 70. In the illustrated embodiment, the first axis 26 is perpendicular to the second axis 70. In other embodiments, the first axis 26 may be oriented at other angles relative to the second axis 70.

Figure 2:
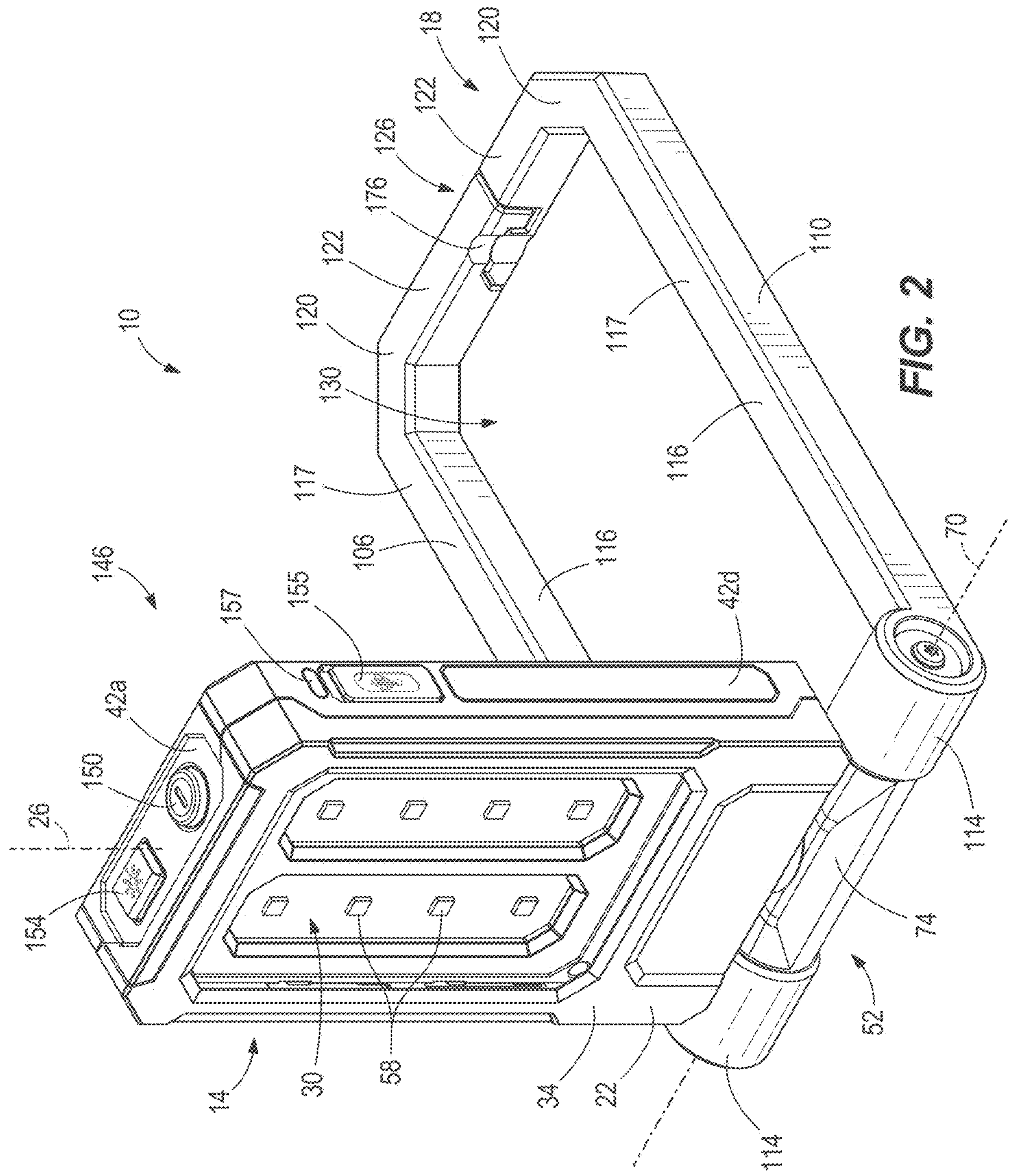
FIG. 2 is a perspective view of the task light of FIG. 1 in a first extended configuration with the light head pivoted away from the support frame.
Figure 3:
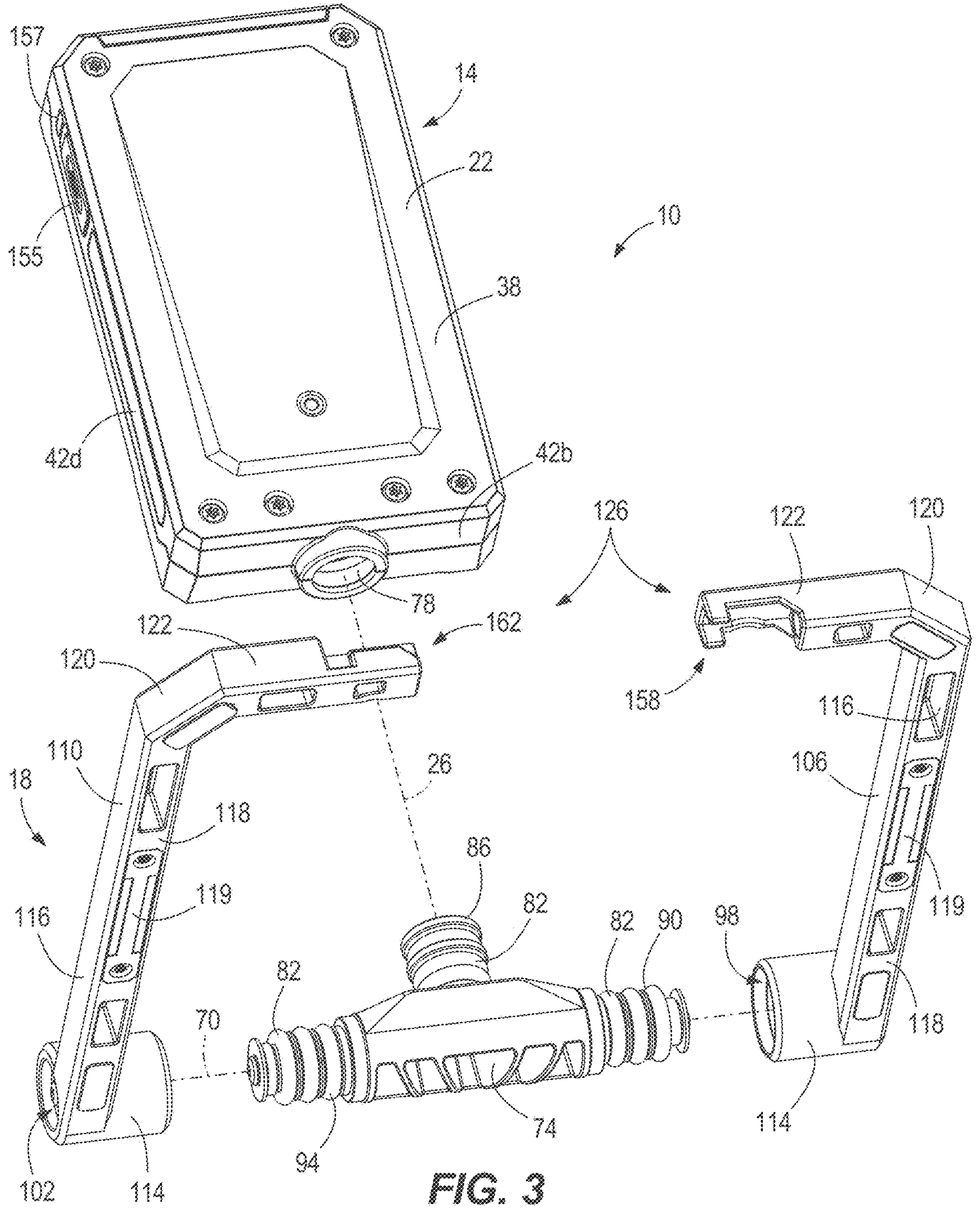
FIG. 3 is an exploded view of the task light of FIG. 1.

With reference to FIGS. 1-3, the light head 14 includes a housing 22 having a front wall 34, a rear wall 38, an upper or distal sidewall 42*a*, a lower or proximal sidewall 42*b*, a left or first sidewall 42*c*, and a right or second sidewall 42*d*. In the illustrated embodiment, the housing 22 is a generally rectilinear panel and is elongated such that the first axis 26 is a longitudinal axis of the housing 22. In other embodiments, the housing 22 may have a different general shape and footprint. Electronic components are disposed in the housing 22, such as a light source 30, a power source 156 (FIG. 4), and a control system for controlling the light source 30. The front wall 34 includes a transparent or translucent portion 46 (e.g., a lens) configured to allow light emitted by the light source 30 to illuminate the area in front of the light head 14. In other embodiments, the light head 14 may be a different style of task light with a different lighting configuration. For example, the light head 14 may include multiple light sources positioned to emit light in multiple directions.

As seen in FIG. 2, the light source 30 may include multiple lighting elements 58 operable to illuminate an area of a task. In the illustrated embodiment, the lighting elements 58 include LEDs mounted on a circuit board. In some embodiments, the lighting elements 58 may include other types of light sources. In some embodiments, the light source 30 includes multiple types of lighting elements 58 such as a first light source configured to emit a first type of illumination and a second light source configured to emit a second type of illumination. In some embodiments, the types of lighting elements 58 may emit light of different colors, frequencies, lumens, beam angles, etc. In other embodiments, other types of lighting elements or configurations may be used.

Figure 19:
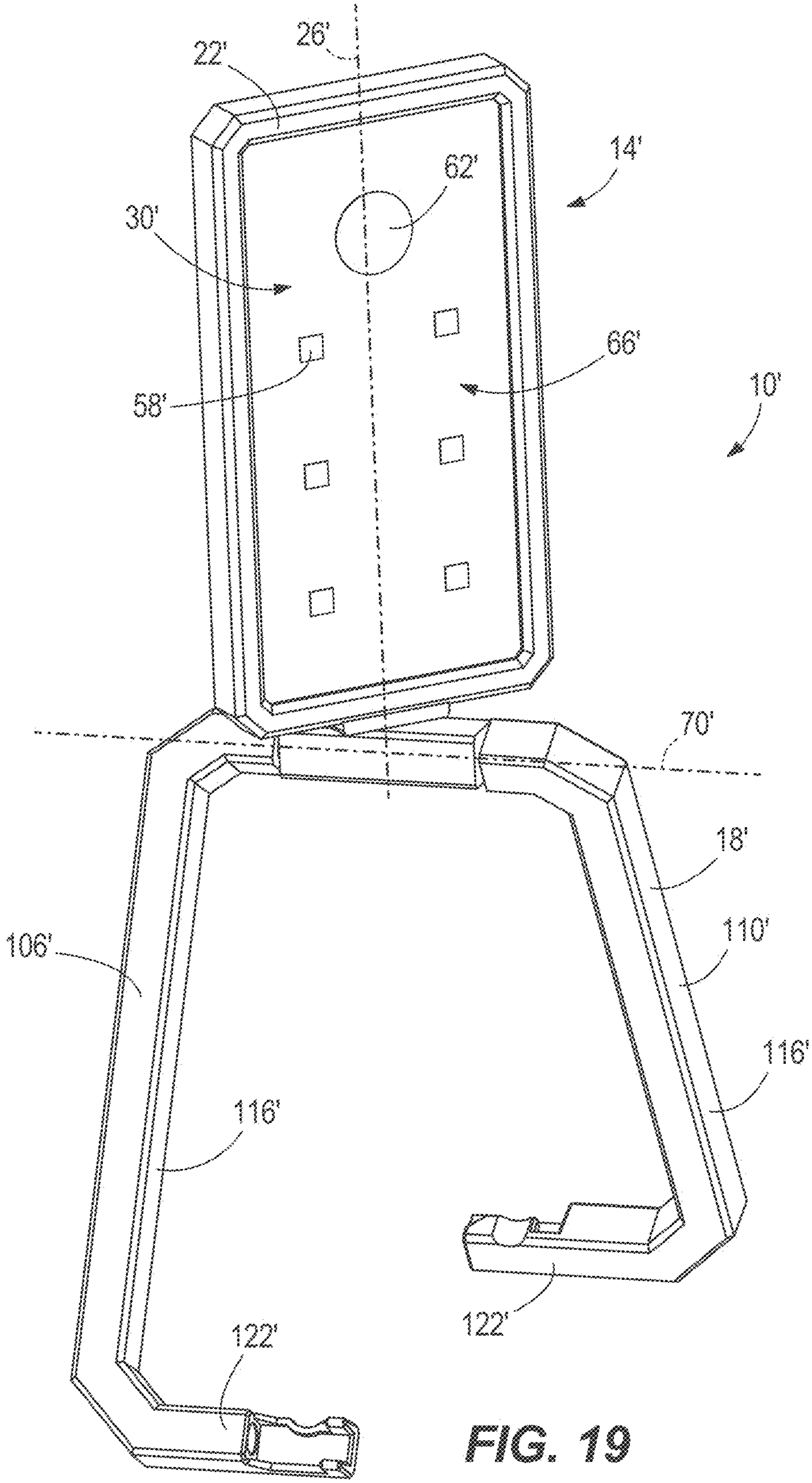
FIG. 19 is a perspective view of a second embodiment of a task light in an extended configuration, the task light including a first type of light source and a second type of light source.

In one example, shown in FIG. 19, a light head 14' includes a first light source formed as a spotlight 62' and a second light source formed as a floodlight 66'. The spotlight 62' is configured to emit a focused beam of light. The floodlight 66' includes an array or group of lighting elements 58' configured to emit a wide beam of dispersed light. In other embodiments, the light head 14' may have other light sources and/or the light sources may be arranged in other configurations.

Referring back to FIG. 2, the control system of the task light 10 includes a user interface 146. In the illustrated embodiment, the user interface 146 includes a power actuator 150 and a MODE actuator 154 positioned on the distal sidewall 46*a*. In the illustrated embodiment, the actuators 150, 154 are buttons. In other embodiments, other controls, buttons, switches, etc. may be included and the controls may be positioned elsewhere on the light. The power actuator 150 may be connected to the power source 156 (FIG. 4) and may provide power to the light source 30. The MODE actuator 154 may be used to switch between a plurality of operating modes to vary the illumination output of the task light 10. For example, the task light 10 may be operable in LOW, HIGH, and FLASH modes, among others. In response to depression of the MODE actuator 154, the control system may alternate which lighting elements 58 are illuminated and/or may control the lighting elements 58 to adjust the characteristics of the light output.

Figure 4:
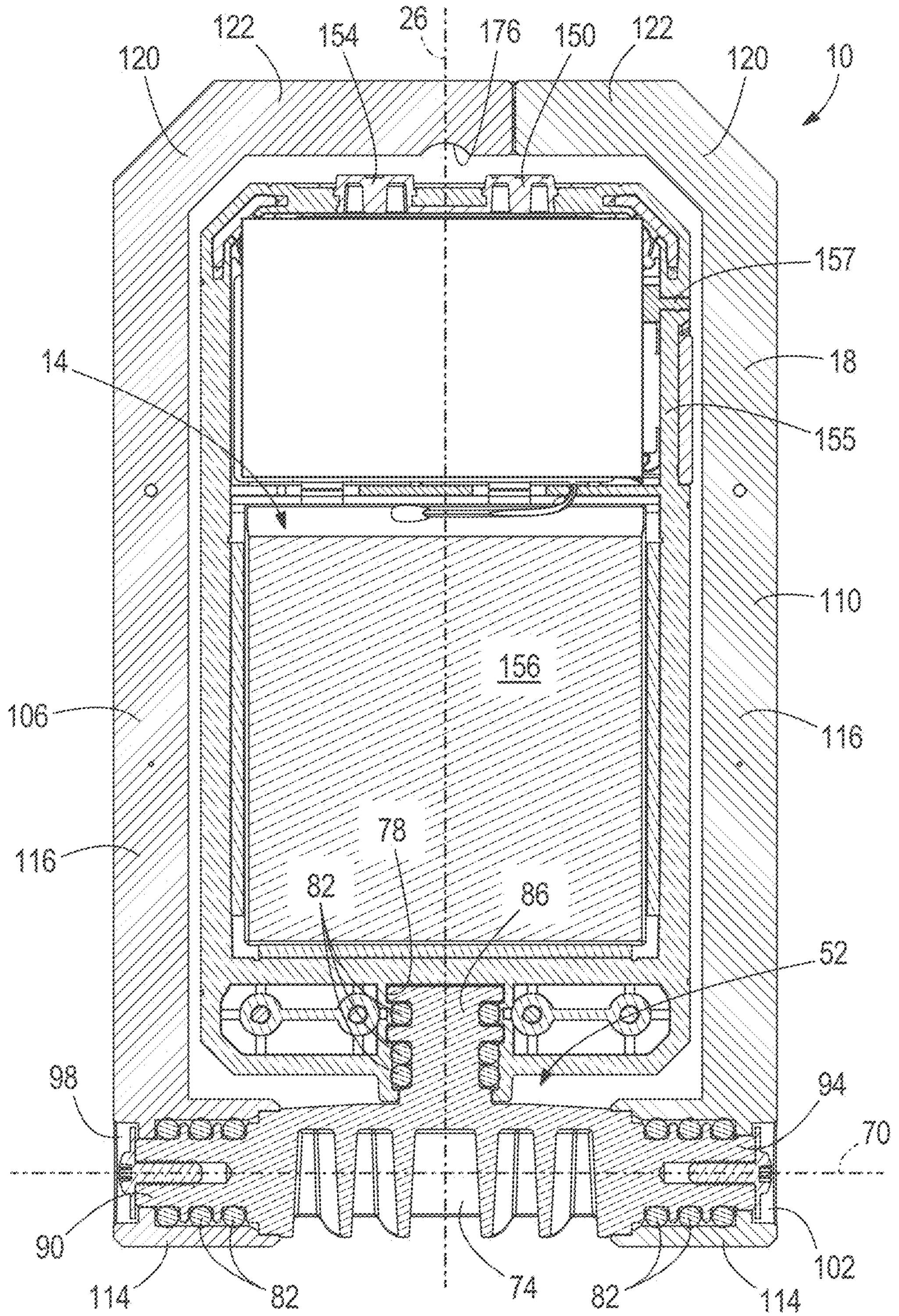
FIG. 4 is a cross-sectional view of the task light of FIG. 1 in the compact configuration.
Figure 20:
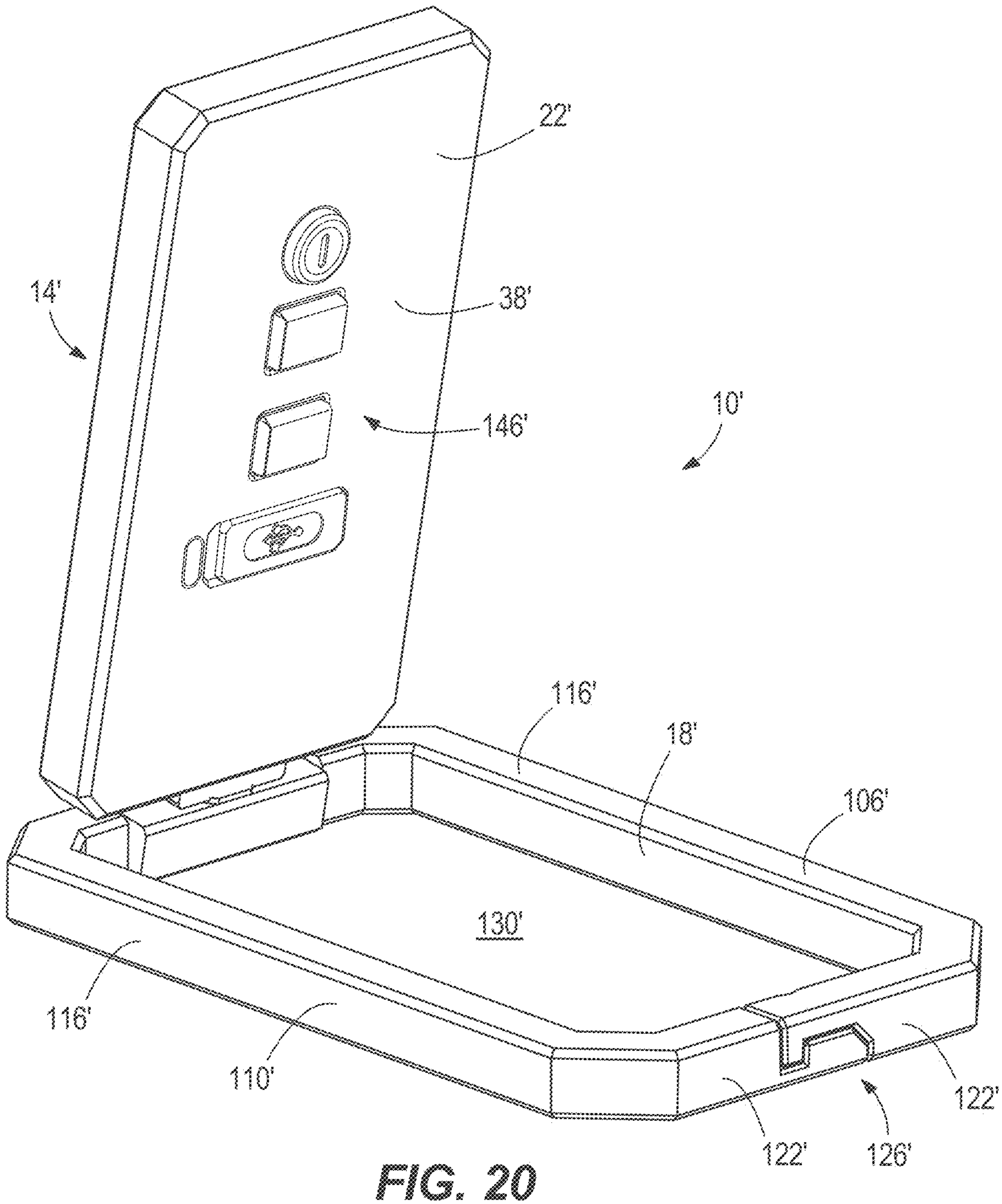
FIG. 20 is a rear perspective view of the task light of FIG. 19 in another extended configuration, the task light including a user interface positioned on a rear wall of a housing.

As seen in FIG. 4 and discussed above, the power source 156 is positioned within the housing 22 of the light head 14. In the illustrated embodiment, the power source 156 is a rechargeable internal lithium-ion battery. In other embodiments, the power source 156 may be a removable rechargeable battery or may include another type of power source. The task light 10 further includes a charging interface with a charging port 155 (FIG. 2) configured to couple the power source 156 (e.g., internal battery) to an external power source to recharge the power source 156. The charging port 155 may be any standard port configuration, including a USB-A or USB-C type port. The charging interface of the light head 14 may include an indicator light 157 adjacent the charging port 155 that changes color and/or frequency to communicate, among other things, a state of charge of the power source 156. In the illustrated embodiment, the charging port 155 and indicator light 157 are on the second side wall 46*d*. In other embodiments, the charging port 155, the indicator light 157, and the other components of the user interface 146 may be alternately positioned elsewhere on the housing 22. For example, as shown in FIG. 20, control and charging components are positioned on a rear face of the light head 14'. The user interface 146 may include additional components not discussed herein, such as a display, screens, indicator lights, additional control buttons, additional ports, etc.

Turning to FIGS. 3 and 4, the pivot joint 52 between the light head 14 and the support frame 18 includes a connector body 74. The connector body 74 includes a head post 86 that extends along and defines the first axis 26. The connector body 74 further includes a pair of leg posts including a first leg post 90 (or left leg post 90) and a second leg post 94 (or right leg post 94) that extend along the second axis 70. The head post 86 is received by an opening 78 in the lower sidewall 42*b* of the housing 22 of the light head 14. The opening 78 engages the head post 86 to rotatably couple the light head 14 to the connector body 74 and to allow rotation of the light head 14 relative to the connector body 74 about the first axis 26. In other embodiments, the connector body 74 may include the opening 78 and the light head 14 may include the head post 86. In still further embodiments, other rotatable coupling methods may be used to secure the light head 14 to the connector body 74. In the illustrated embodiment, the housing 22 may be formed from two halves that are assembled around the head post 86 to secure the head 14 against translation relative to the connector body 74. In other embodiments, a fastener or other coupling method may be used to couple the light head 14 to the head post 86. In the illustrated embodiment, the joint 52 includes gaskets 82 positioned around the head post 86. The gaskets 82 provide friction to the connection to maintain the position of the light head 14 relative to the connector body 74. Additionally, the gaskets 82 may inhibit environmental ingress (e.g., of dust, liquids, etc.) into the housing 22 to isolate the electronics from the environment.

With reference to FIG. 3, in the illustrated embodiment, the support frame 18 includes a pair of legs having a first leg 106 and a second leg 110. The first leg 106 includes a first opening 98 that receives the first leg post 90 and the second leg 110 includes a second opening 102 that receives the second leg post 94. The first leg post 90 is received by the first opening 98 in the first leg 106 to rotatably couple the first leg 106 to the connector body 74 for rotation about the second axis 70. The second leg post 94 is received in the second opening 102 of the second leg 110 to rotatably couple the second leg 110 to the connector body 74 for rotation about the second axis 70. In other embodiments, the legs 106, 110 may include the posts 90, 94 and the connector body 74 may include the openings 98, 102. The legs 106, 110 are separately coupled to the connector body 74 and are independently rotatable about the second axis 70. Thus, the support frame 18 is coupled to the connector body 74 for rotation about the second axis 70.

With continued reference to FIG. 3, each of the legs 106, 110 extends between a base end 114 and a distal end 120. Looking at the first leg 106, in the illustrated embodiment, the base end 114 includes a cylindrical hub and the opening 98 is a through bore extending through the base end 114. Each leg 106, 110 is coupled to the connector body 74 by a fastener (not shown) that is inserted into the opening 98 from the outside and engages the first leg post 90 of the connector body 74 received by the opening 98. The second leg 110 is similarly coupled to the second leg post 94. Both leg posts 90, 94 may include gaskets 82 to maintain the position of the legs 106, 110 relative to the connector body 74.

Each leg 106, 110 may further include a leg body 116 between the base end 114 and the distal end 120. The leg body 116 extends from the cylindrical hub at the base end 114 eccentrically such that the leg body 116 is offset from the second axis 70. The leg body 116 includes a front face 117 and a rear face 118. The rear face 118 may include hollow portions to assist in the manufacturing and reduce the weight of the legs 106, 110. The legs 106, 110 may each include at least one magnet 119 embedded in the leg body 116. The magnets 119 may be installed into one of the hollow portions and may be secured by a plate held by screws. In some embodiments, the magnets 119 may be over molded in the leg body 116, may be press fit into an opening, or may be otherwise coupled to the leg body 116.

Each leg body 116 at the distal end 120 includes a cross beam 122 having coupling features 126 that removably or selectively couple the first leg 106 and the second leg 110. When the legs 106, 110 are coupled to each other and to the connector body 74, the support frame 18 forms an open rectangle configuration defining a center receiving area 130 (FIG. 2) between the legs 106, 110. The center receiving area 130 is sized and shaped to receive the housing 22 of the light head 14, as seen in the compact position shown in FIGS. 1 and 4. In embodiments where the housing 22 is shaped differently, the support frame 18 may similarly be shaped differently to create a center receiving area 130 capable of receiving the light head 14.

Thus, the light head 14 is movably coupled to the support frame 18 by the joint 52 to position the light head 14 relative to a support surface or other support, and to direct the emitted light toward a desired area, such as the area of a task operation. The light head 14 is movable relative to the support frame 18 about the first axis 26 via the engagement between the head post 86 of the connector body 74 and the opening 78 in the light head 14. The light head 14 may be rotatable about the first axis 26 with respect to the connector body 74 and the support frame 18 at least 360 degrees. In some embodiments, the light head 14 may be limited to a range of 360 degrees about the first axis 26. In other embodiments, the light head 14 may be capable of infinite rotation relative to the connector body 74 about the first axis 26, or in other words the light head 14 may rotate more than 360 degrees about the first axis 26. The light head 14 is movable relative to the support frame 18 about the second axis 70 via the engagement between the leg posts 90, 94 of the connector body 74 and the openings 98, 102 in the support frame 18. The connector body 74 and the attached light head 14 are rotatable relative to the support frame 18 about the second axis 70 by approximately 270 degrees. In other words, each leg 106, 110 may be movable with respect to the connector within a range of 270 degrees. The light 10 is therefore movable between the compact configuration, shown in FIG. 1, and the plurality of extended configurations, some of which are shown in FIGS. 2, 5, 6, and 7.

Figure 8:
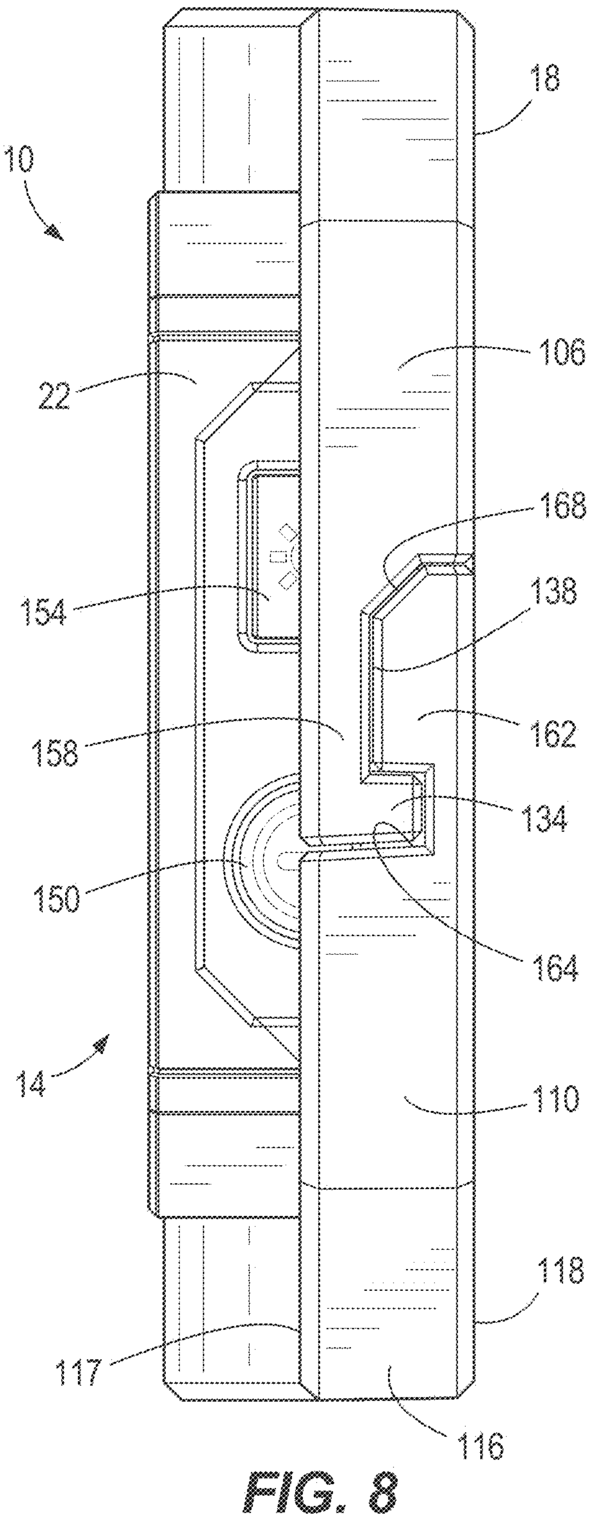
FIG. 8 is an end view of the task light of FIG. 1 in the compact configuration.

As discussed above, in the compact configuration, the light head 14 is collapsed toward the support frame 18 and positioned in the center receiving area 130 formed between the first leg 106 and the second leg 110. The first leg 106 and second leg 110 are connected by the coupling features 126 to completely surround the center receiving area 130. The light head 14 is rotated about the longitudinal axis 26 so the housing 22 lies generally within the plane of the support frame 18 and the sidewalls 42*c*, 42*d* are positioned adjacent the legs 106, 110. The first leg 106 and second leg 110, thereby, also surround a perimeter of the light head 14. The housing 22 is thicker than the support frame 18 and the leg bodies 116 are offset from the second axis 70 such that the sidewalls 42*a*, 42*b*, 42*c*, 42*d* are partially visible and accessible when the task light 10 is in the compact configuration, as seen in FIG. 8. In the illustrated compact configuration, the front wall 34 is illustrated as forward of the legs 106, 110 and the rear wall 38 is flush with the rear faces 118 of the leg bodies 116. The compact configuration may instead include the light head 14 rotated 360 degrees so the rear wall 38 is forward of the legs 106, 110 and the front wall 34 is flush with the rear faces 118 of the leg bodies 116. The task light 10 is easily transported and stored in the compact configuration. The slim profile allows an operator to slide the task light 10 into small storage spaces (e.g., a pocket, a toolbox, etc.). Additionally, the offset of the leg bodies 116 allows the magnets 119 on the rear faces 118 of the legs 106, 110 to engage a ferromagnetic support surface in the compact configuration without the light head 14 interfering. The task light 10 therefore provides a compact and portable lighting solution for providing illumination to work areas.

FIG. 2 illustrates the task light 10 in a first extended configuration. The legs 106, 110 of the support frame 18 are connected and surround the center receiving area 130, and the light head 14 is pivoted out of the center receiving area 130. In the illustrated embodiment, the light head 14 is rotated away from the support frame 18 about the second axis 70 by about 90 degrees. In one exemplary use case, an operator may move the task light 10 to the first extended configuration before setting the task light 10 on a support structure such as the ground or a lateral surface (e.g., a tabletop, a workbench, etc.). The support frame 18 engages the surface and supports the light head 14 to direct light toward a task area. The task light 10 may also be moved to the first extended configuration for use in other situations and with other support structures.

Figure 5:
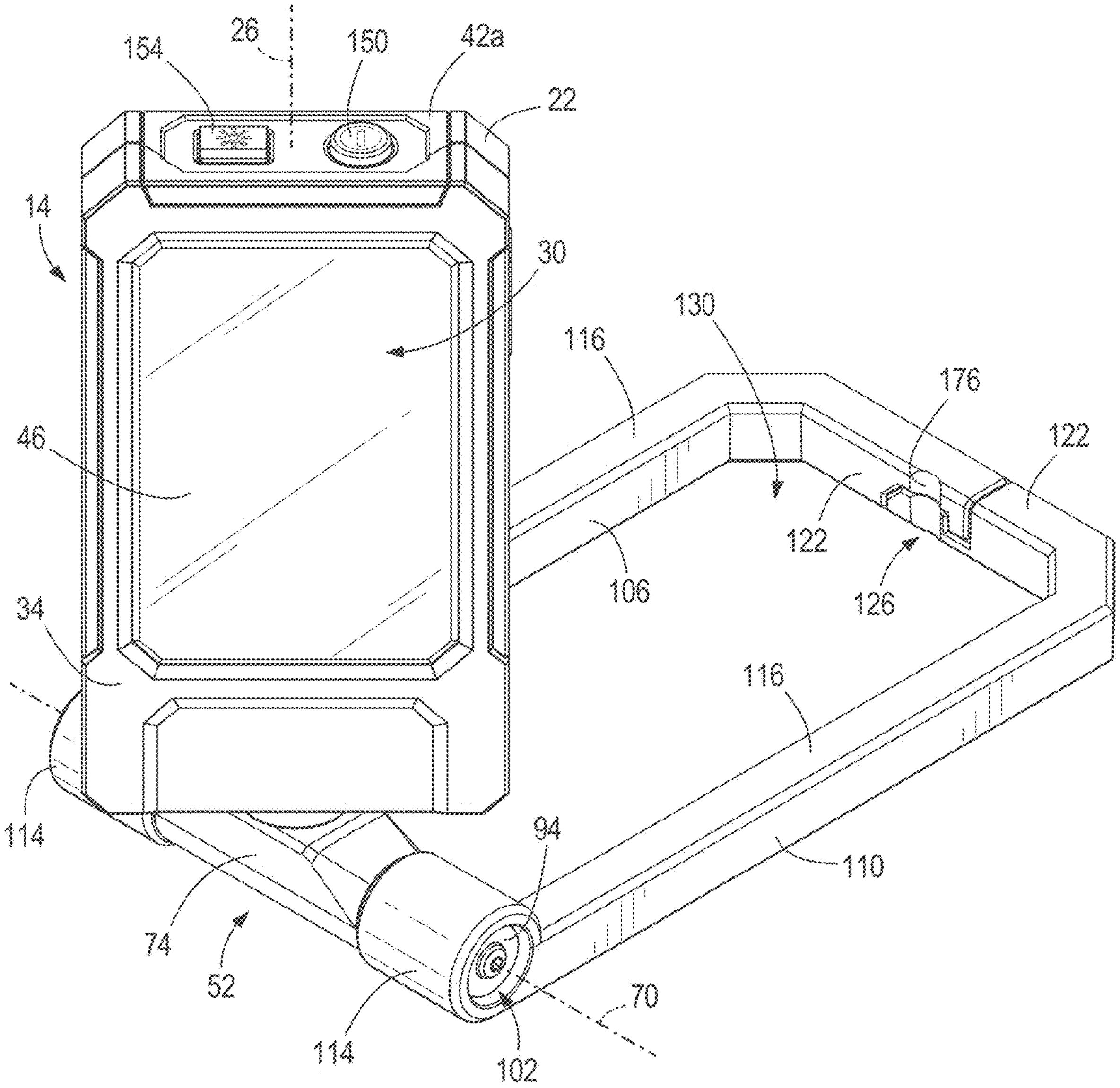
FIG. 5 is a perspective view of the task light of FIG. 1 in a second extended configuration with the light head pivoted away from the support frame and rotated.

FIG. 5 illustrates the task light 10 in a second extended configuration. The legs 106, 110 of the support frame 18 are connected and surround the center receiving area 130. The light head 14 is pivoted out of the center receiving area 130. The light head 14 is also rotated relative to the support frame 18 about the first axis 26. In the illustrated embodiment, the light head 14 is rotated about the second axis 70 by about 90 degrees and about the first axis 26 by about 45 degrees. In one exemplary use case, an operator may move the task light 10 to the second extended configuration before setting the task light 10 on a support structure such as the ground or a lateral surface. The support frame 18 engages the surface and supports the light head 14 to direct light toward a task area. The task light 10 may also be moved to the second extended configuration for use in other situations and with other support structures.

Figure 6:
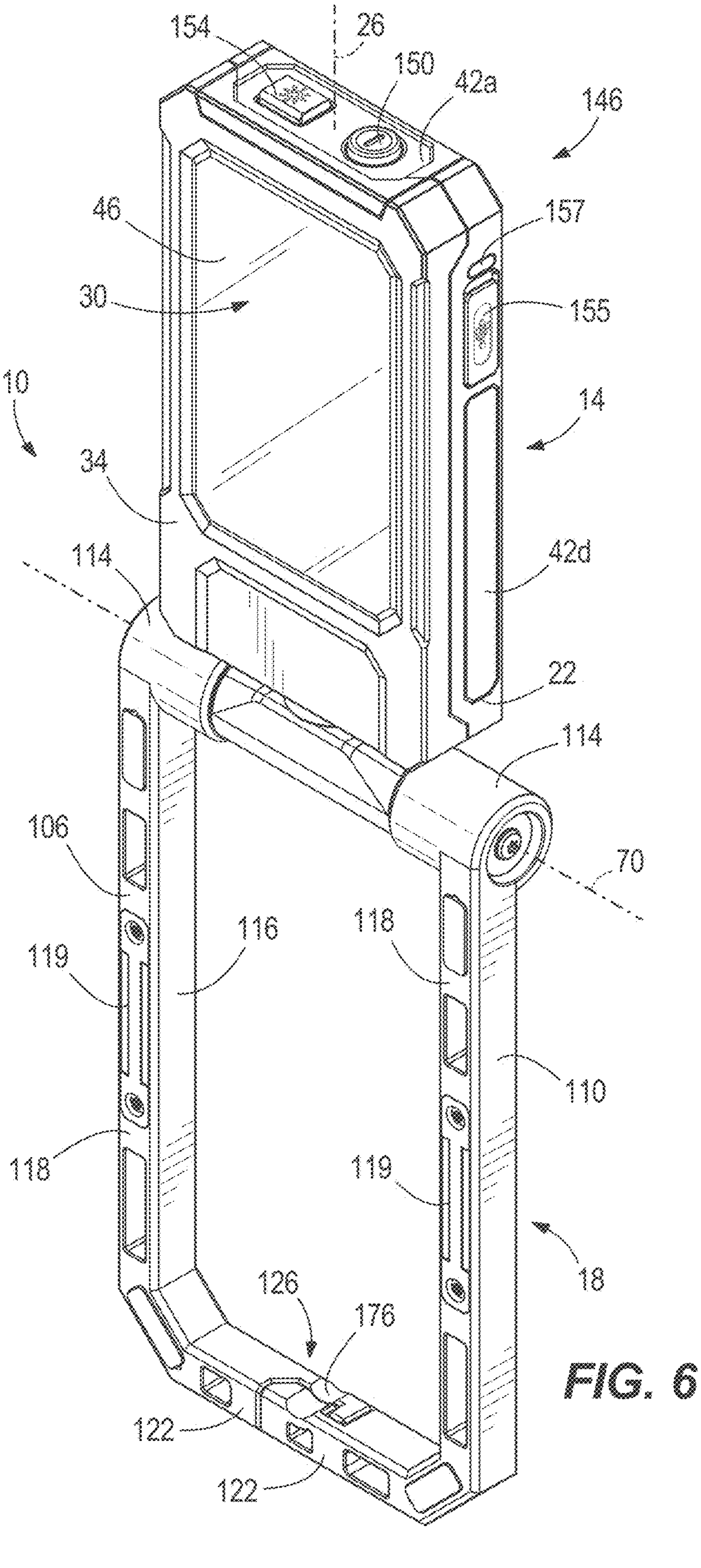
FIG. 6 is a perspective view of the task light of FIG. 1 in a third extended configuration with the light head pivoted away from the support frame.

FIG. 6 illustrates the task light 10 in a third extended configuration. The legs 106, 110 of the support frame 18 are connected and surround the center receiving area 130. The light head 14 is pivoted out of the center receiving area 130. In the illustrated embodiment, the light head 14 is rotated about the second axis 70 by about 180 degrees such that the light head 14 is aligned with the support frame. In one exemplary use case, an operator may move the task light 10 to the third extended configuration before coupling the task light 10 to a support structure such as a vertical surface. The support frame 18 engages the surface and supports the light head 14 to direct light toward a task area. The task light 10 may also be moved to the third extended configuration for use in other situations and with other support structures.

Figure 7:
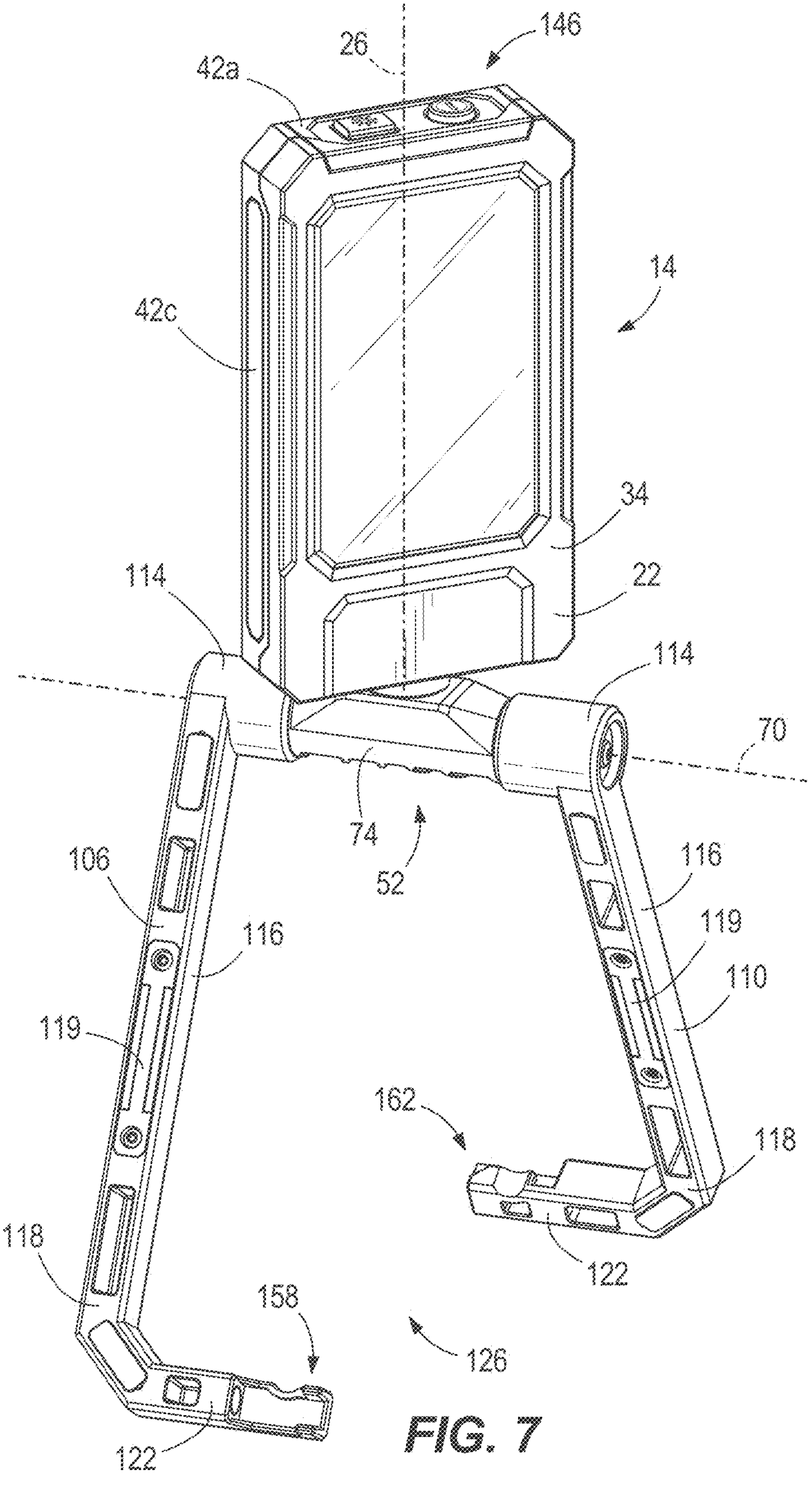
FIG. 7 is a perspective view of the task light of FIG. 1 in a fourth extended configuration with the light head pivoted and rotated relative to the support frame and the pair of legs of the support frame spaced from each other.

FIG. 7 illustrates the task light 10 in a fourth extended configuration. The legs 106, 110 of the support frame 18 are unconnected and rotated about the second axis 70 relative to the light head 14 by different amounts. In the illustrated configuration, the light head 14 is positioned generally opposite the legs 106, 110. In other configurations, the light head 14 may instead be positioned adjacent and/or between the legs 106, 110. In one exemplary use case, an operator may move the task light 10 to the fourth extended configuration before setting (e.g., standing) the task light 10 on a support structure such as the ground or a lateral surface. The cross beams 122 at the distal ends 120 of the legs 106, 110 engage the surface to support the light head 14 to direct light toward a task area. The task light 10 may also be moved to the fourth extended configuration for use in other situations and with other support structures.

Figure 9A:
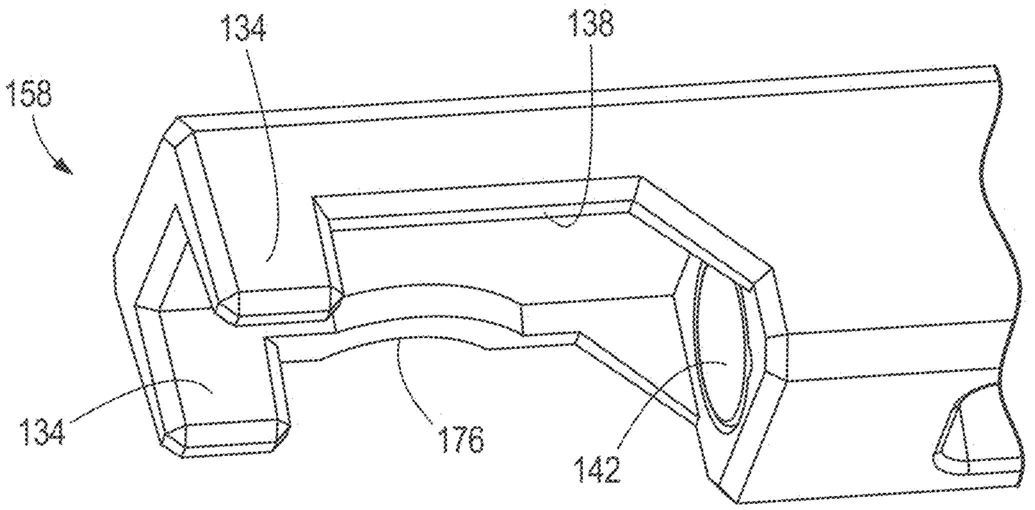
FIG. 9A is a detail view of a connection interface of a first of the pair of legs of FIG. 1.
Figure 9B:
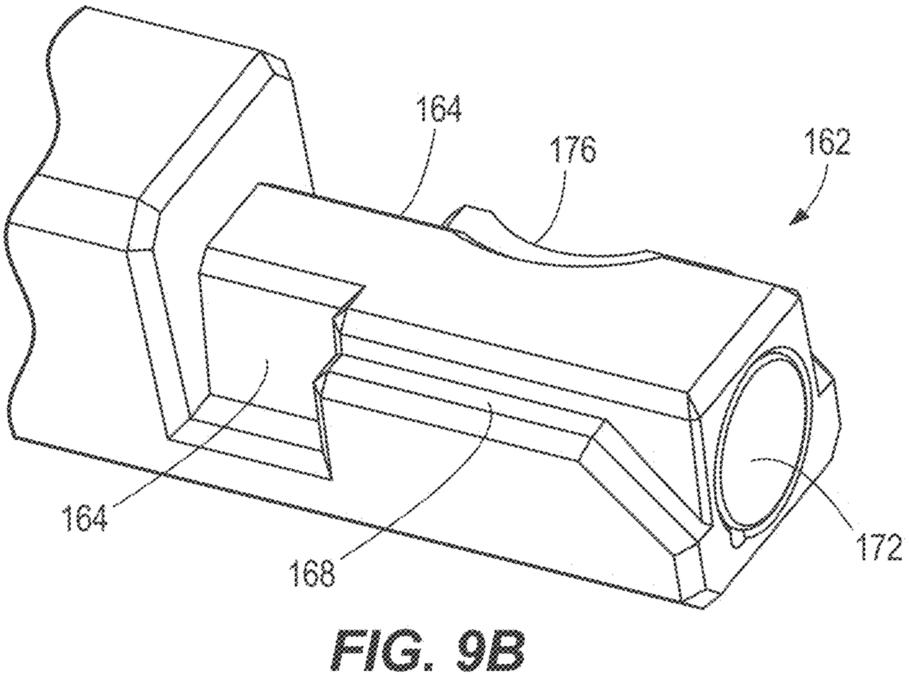
FIG. 9B is a detail view of a connection interface of a second of the pair of legs of FIG. 1.
Figure 10:
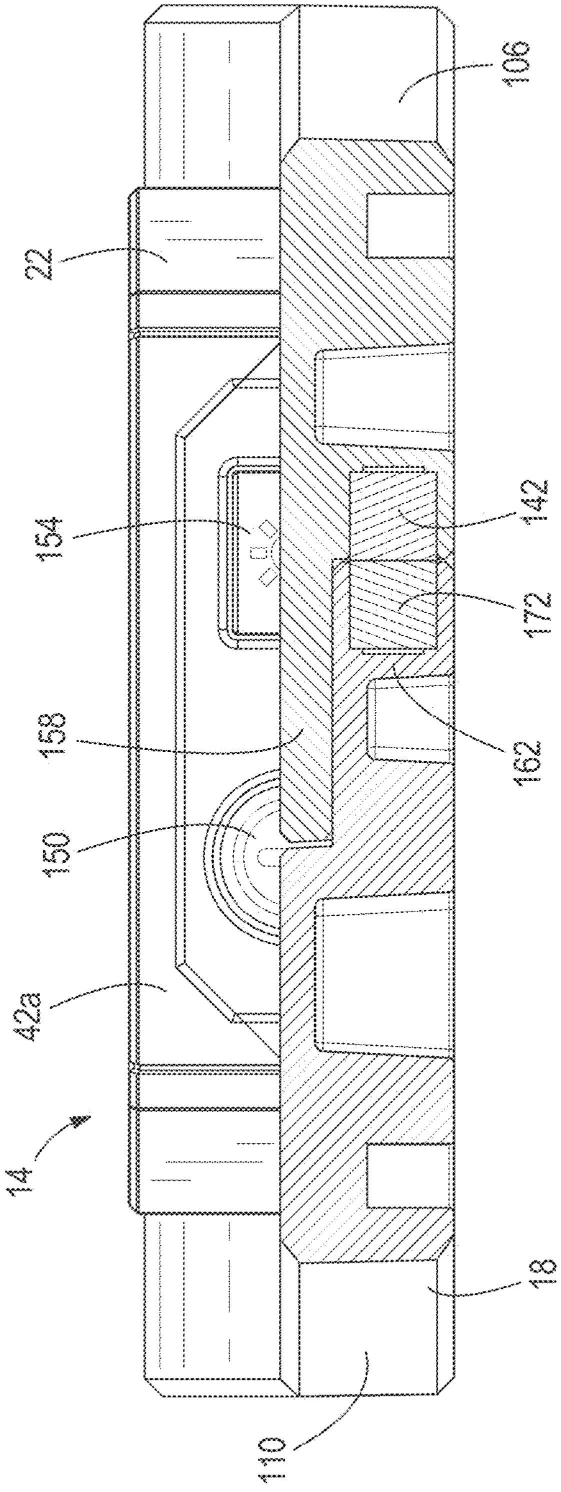
FIG. 10 is a cross-sectional view of the pair of legs of FIG. 1 in a coupled state.
Figure 11:
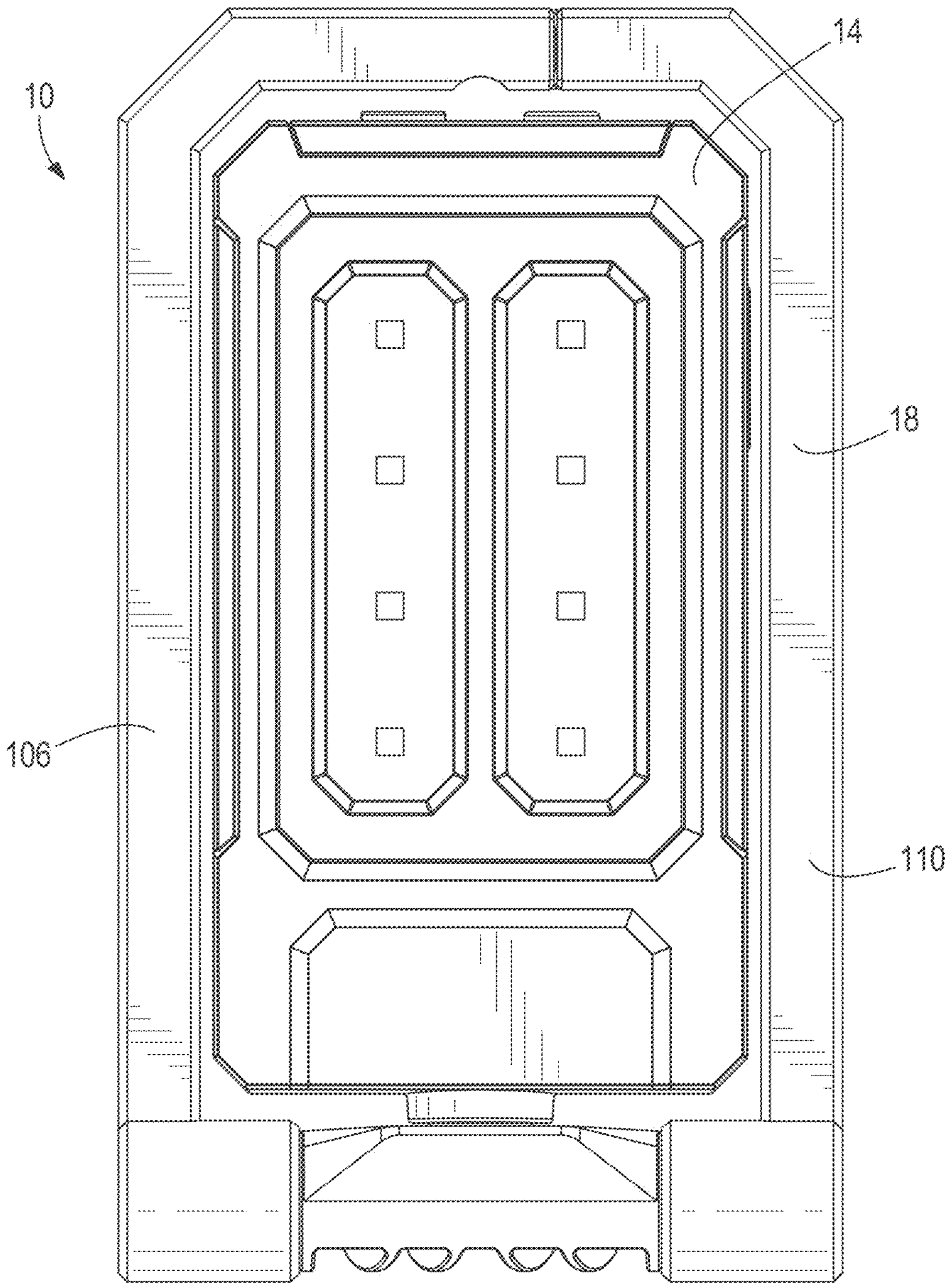
FIG. 11 is a top view of the task light of FIG. 1 in the compact configuration.
Figure 12:
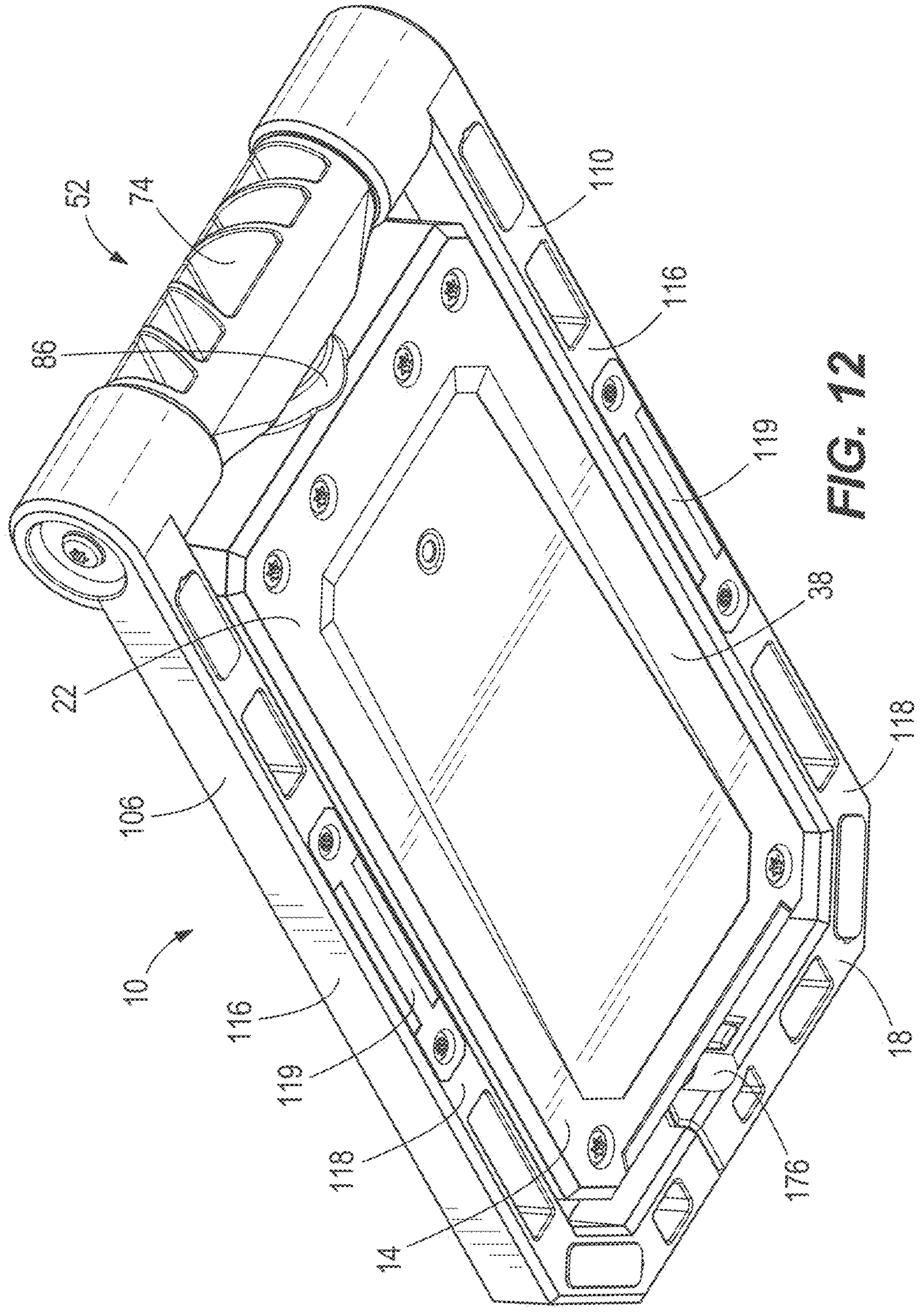
FIG. 12 is a lower perspective view of the task light of FIG. 1 in the compact configuration.
Figure 13:
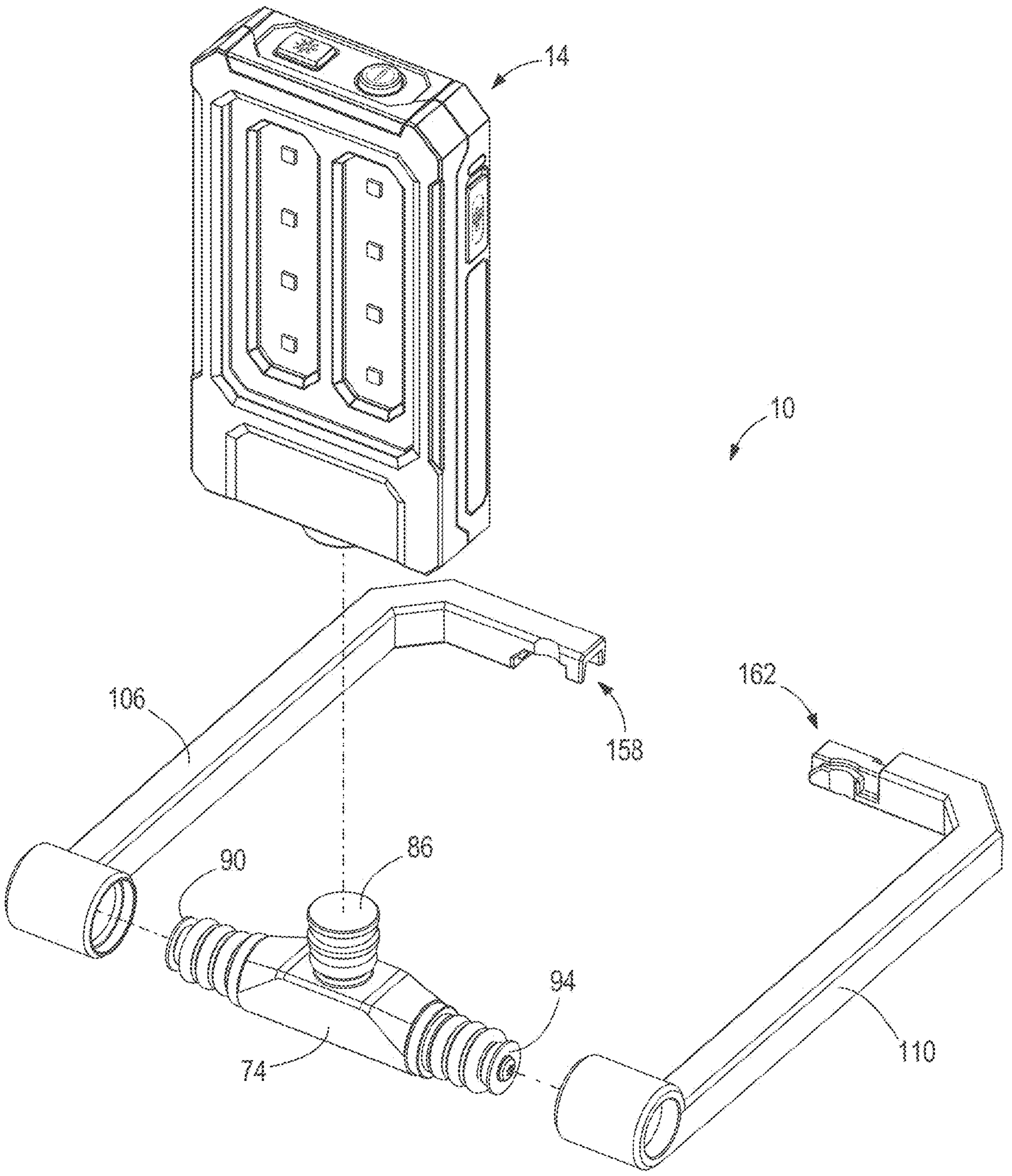
FIG. 13 is an exploded perspective view of the task light of FIG. 1.
Figure 14:
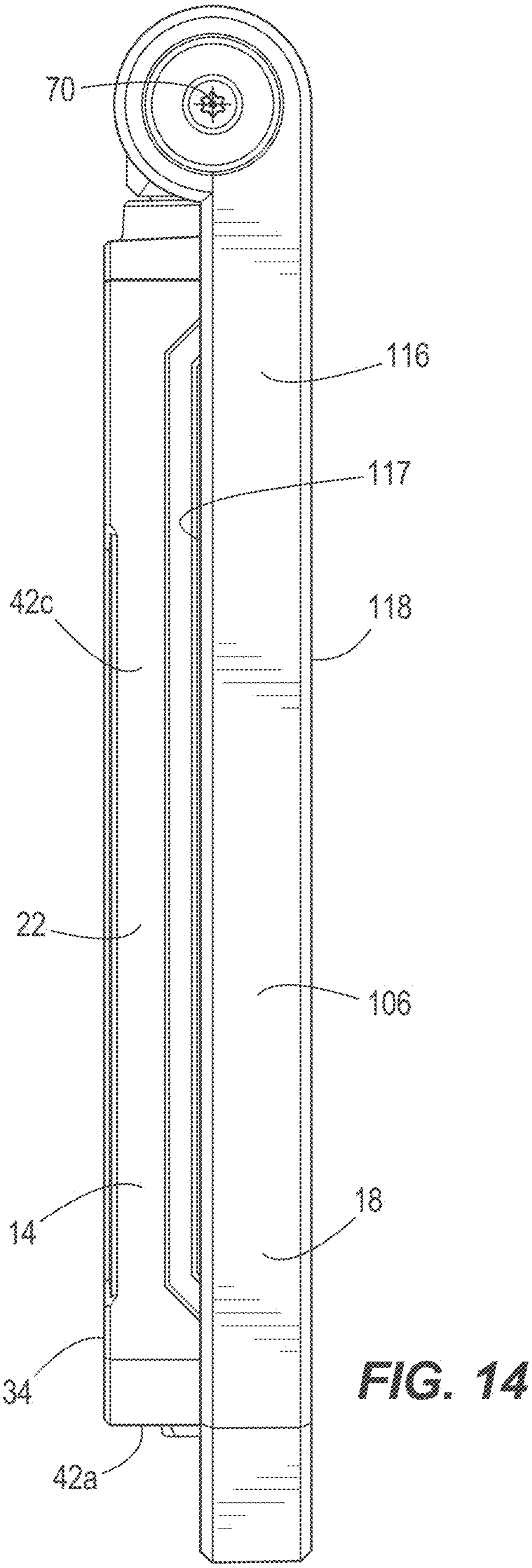
FIG. 14 is a side view of the task light of FIG. 1 in the compact configuration.
Figure 15:
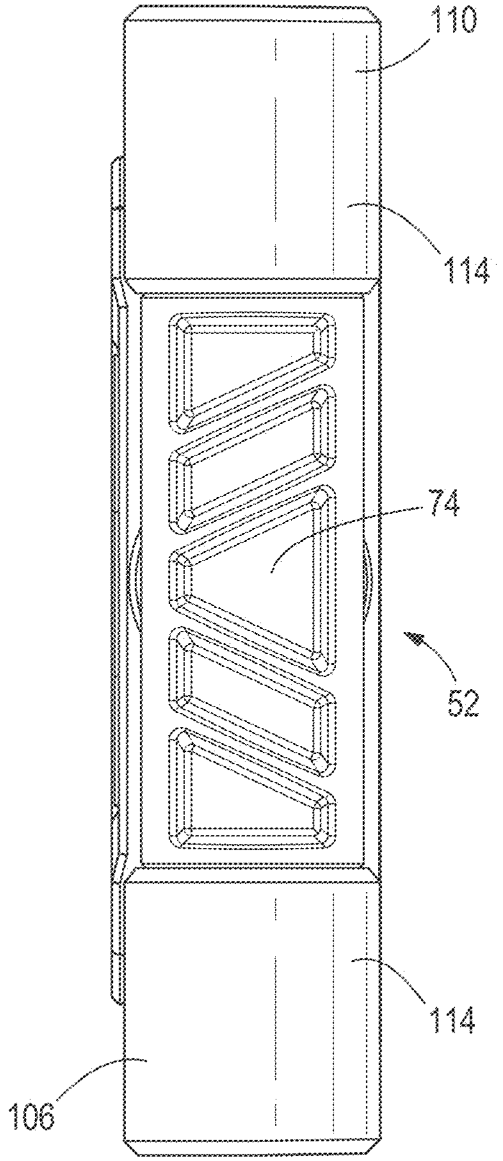
FIG. 15 is an end view of the task light of FIG. 1 in the compact configuration.
Figure 16:
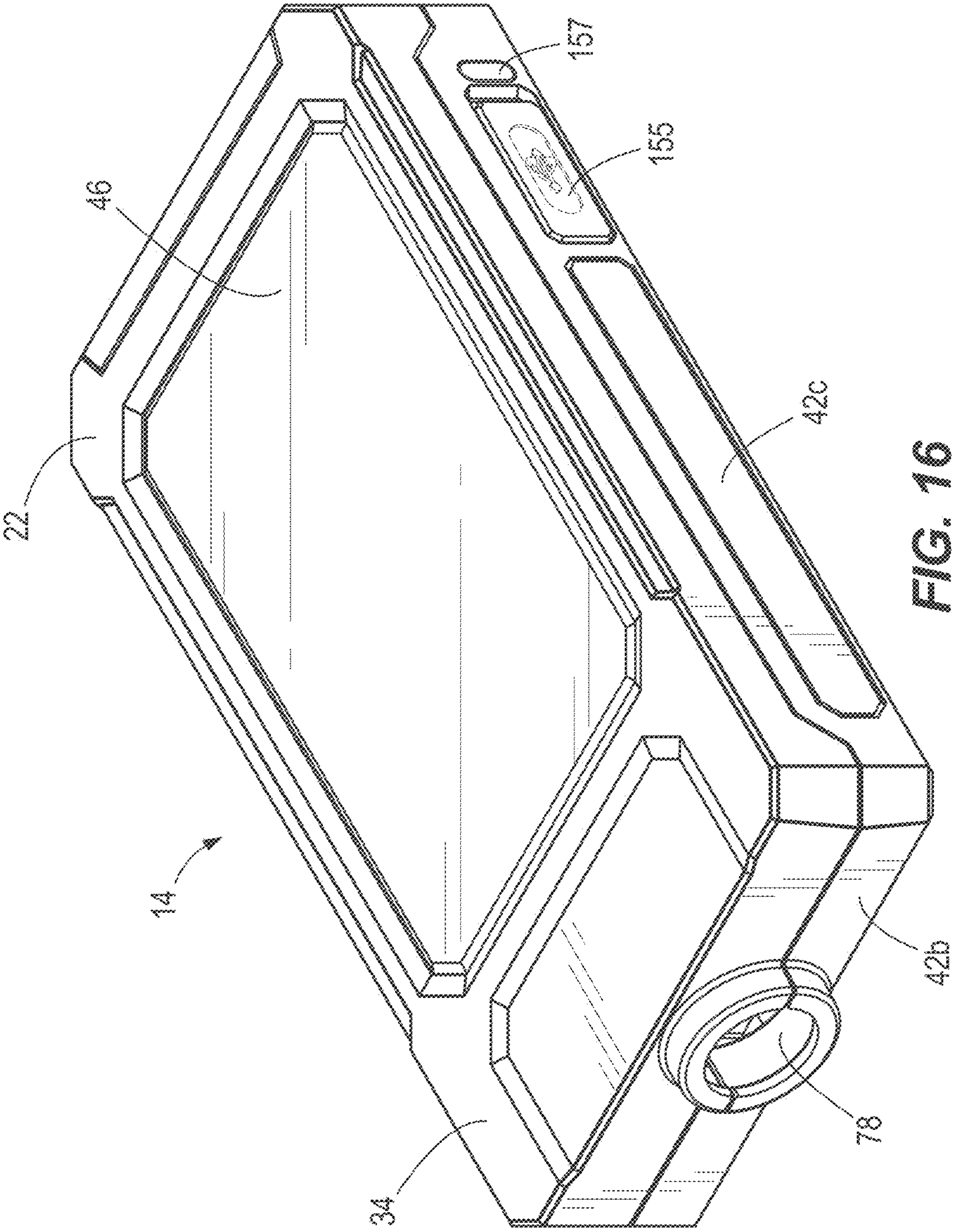
FIG. 16 is a perspective view of the light head of the task light of FIG. 1.
Figure 17:
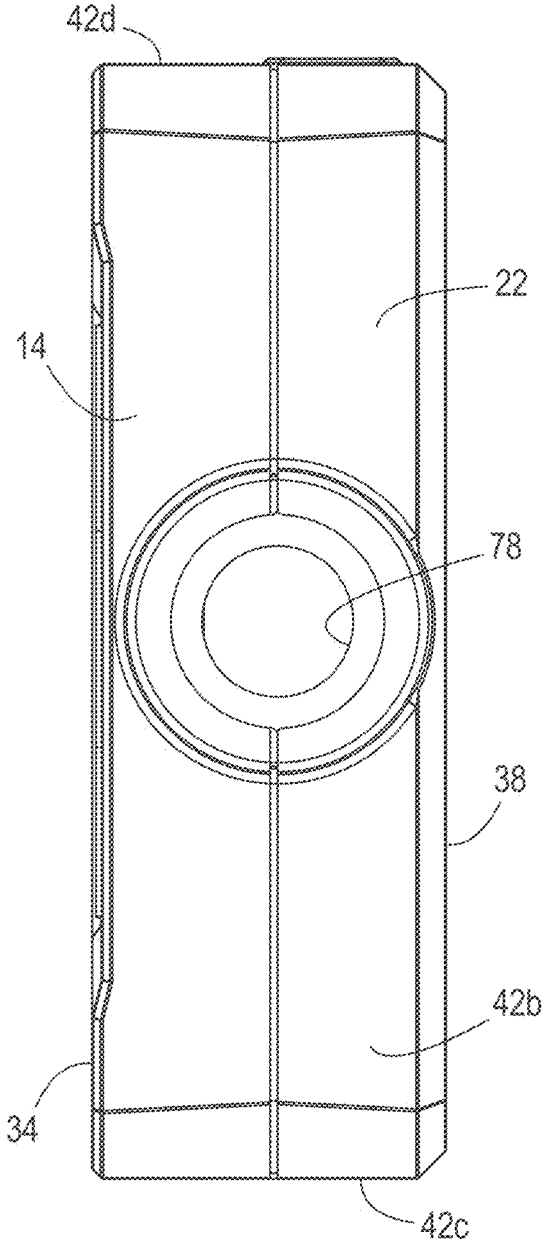
FIG. 17 is a proximal end view of the light head of the task light of FIG. 1.
Figure 18:
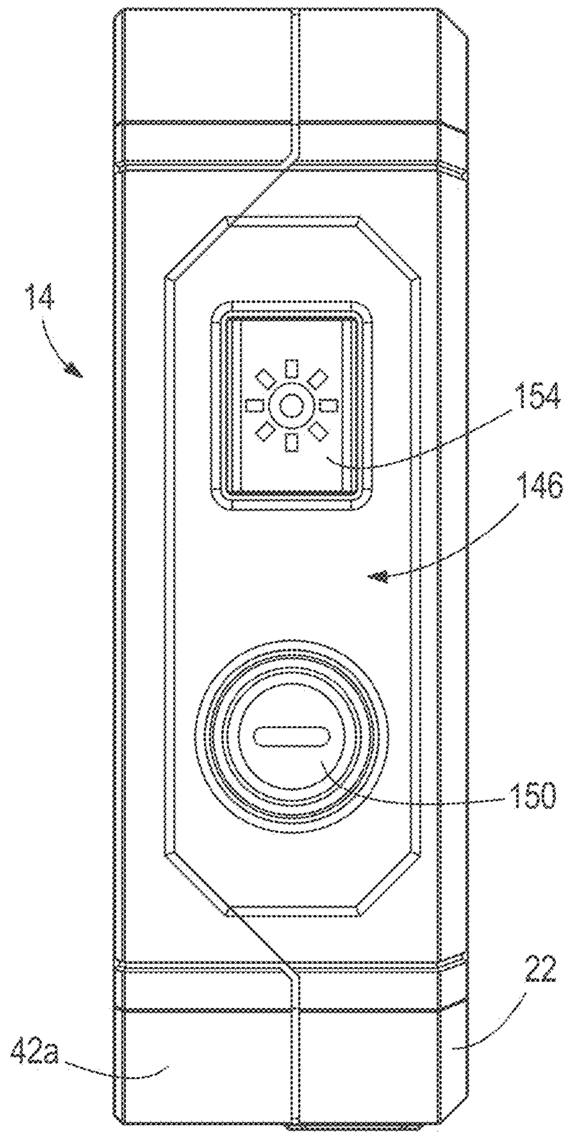
FIG. 18 is a distal end view of the light head of the task light of FIG. 1.

With reference to FIGS. 8-10, the coupling features 126 of the first leg 106 and the second leg 110 are discussed in detail. In the illustrated embodiment, the coupling features 126 include a first connection interface 158, shown in FIG. 9A, positioned on the first leg 106 and a second connection interface 162, shown in FIG. 9B, positioned on the second leg 110. In other embodiments, the first connection interface 158 and second connection interface 162 may be interchanged and positioned on the opposite leg. The first connection interface 158 includes a pair of tabs 134, a first locking profile 138, and a first magnet 142. The second connection interface 162 includes a pair of grooves 164, a second locking profile 168, and a second magnet 172. In the illustrated embodiment, each interface 158, 162 includes a magnet 142, 172. In some embodiments, one of the magnets may be replaced with a ferromagnetic object (e.g., a metal block or plate). In the illustrated embodiment, the first locking profile 138 and second locking profile 168 are complementary and include a straight portion and a slanted portion. As seen in FIG. 8, when the first leg 106 is coupled to the second leg 110, the pair of tabs 134 engage the pair of grooves 164. Each tab 134 extends in a single plane and moves downward into the grooves 164. In the coupled position, the slanted portion of the first locking profile 138 engages the slanted portion of the second locking profile 168. As seen best in FIG. 8, in the coupled position, the first magnet 142 engages the second magnet 172 to retain the first leg 106 adjacent the second leg 110. In the illustrated embodiment, the tabs 134, grooves 164, and profiles 138, 168 act as alignment features to ensure proper engagement of the magnets 142, 172 and the legs 106, 110 are held together by the attraction between the magnets 142, 172. The alignment features may also act as indicators to illustrate if the legs 106, 110 are fully coupled. Once coupled, the legs 106, 110 rotate together about the second axis 70. In other embodiments, the coupling features 126 may include alternate or additional features to align and secure the first leg 106 to the second leg 110. The connection allows a user to easily separate the legs 106, 110 of the support frame 18 when needed and easily re-connect the legs 106, 110.

Figure 23:
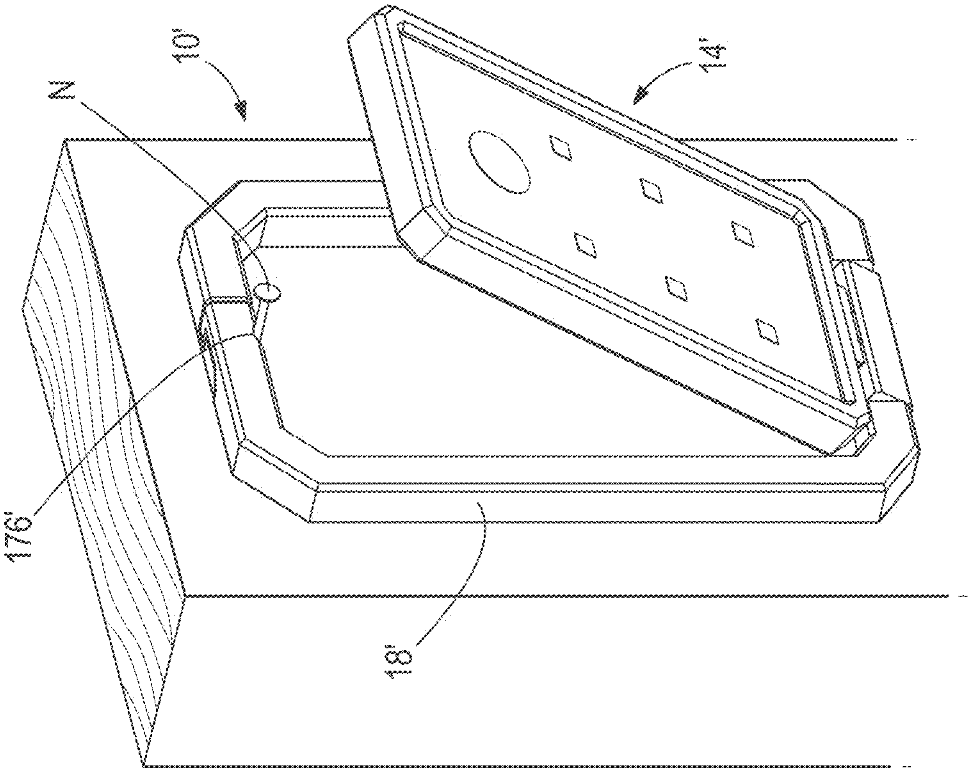
FIG. 23 is a perspective view of the task light of FIG. 19 supported on another support structure (e.g., a vertical surface) via a hook or nail.

In the illustrated embodiment, the first leg 106 and second leg 110 each include a portion of a notch 176 (FIG. 4) formed on an inside surface of the support frame 18. In the illustrated embodiment, the portions of the notch 176 are positioned on the connection interfaces 158, 162. In other embodiments, the notch 176 may be positioned elsewhere on the support frame 18 spaced from the coupling features 126. When the legs 106, 110 are coupled together the notch 176 allows an operator to mount the task light 10. For example, as seen in FIG. 23, the task light 10 may be positioned with the support frame 18 surrounding a fastener such as a screw, nail, or hook. The fastener is positioned within the notch 176 to hang the task light 10 on the support and inhibit movement of the support frame 18 relative to the fastener.

Figure 27:
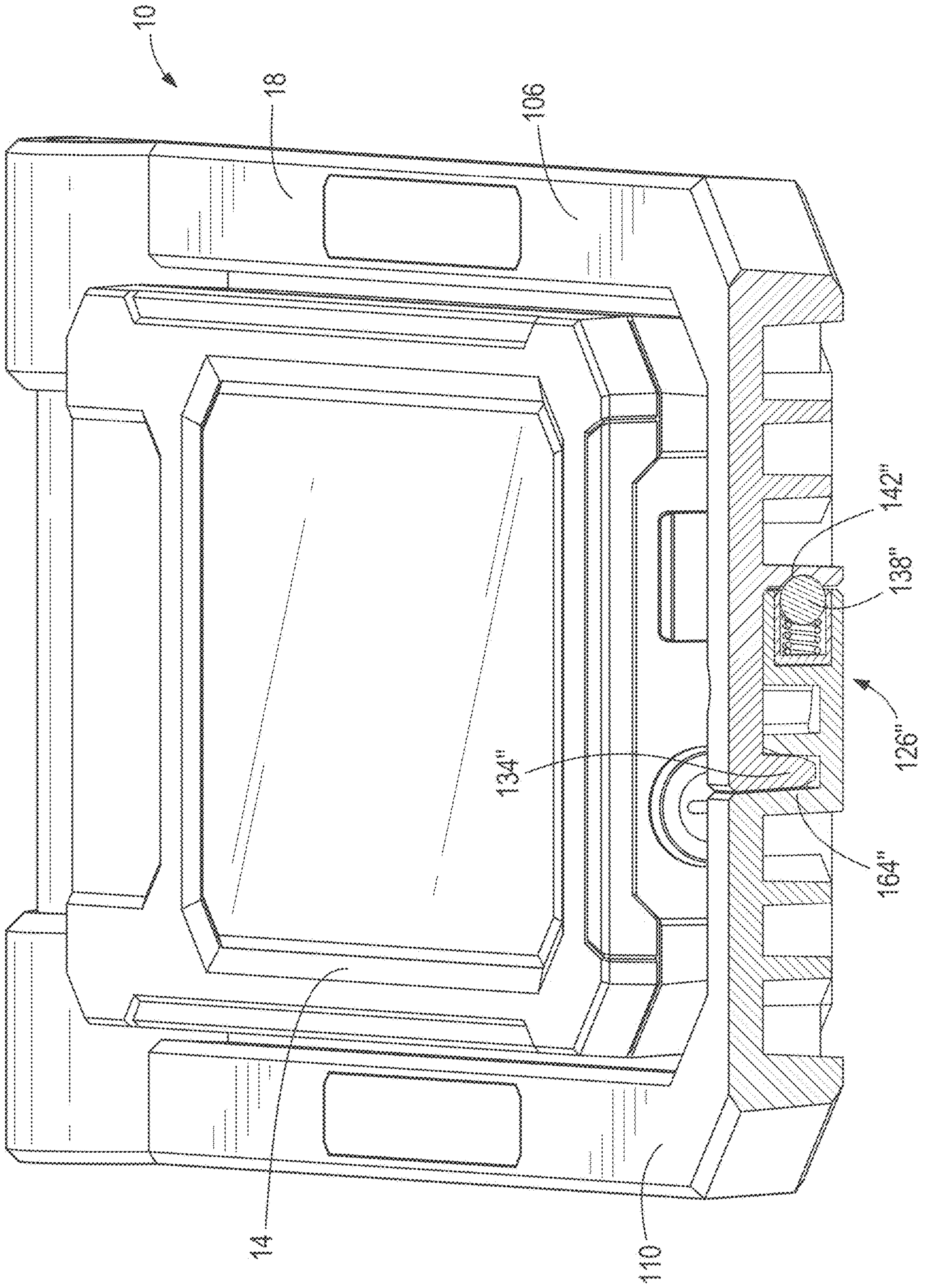
FIG. 27 is a perspective, cross-sectional view of a fourth embodiment of a task light including alternate connection interfaces for coupling a pair of legs.

FIG. 27 illustrates a set of alternate coupling features 126" for connecting the legs 106, 110 of the support frame 18. A tab 134" on the first leg 106 engages a groove 164" on the second leg 110. The second leg 110 includes a spring-loaded ball 138" which is biased outward. A detent 142" is positioned in the corresponding surface on the first leg 110. Thus, the tab 134" helps the operator to align the legs 106, 110 and the spring-loaded ball 138" engages the detent 142" to connect the first leg 106 and the second leg 110. The connection can be broken by applying a separating force to the legs 106, 110 overcoming the biasing force of the spring-loaded ball 138". In other embodiments, other latching features 126 may be used, including magnets, snap features, additional moving latch components, etc.

FIGS. 19-27 illustrate another task light 10'. The task light 10' is generally similar to the task light 10 of FIGS. 1-18 and similar parts are indicated with the same reference numbers with an apostrophe. As discussed above, the light source 30' of the task light 10' includes a spotlight 62' and a floodlight 66'. The user interface 146' is positioned on the rear wall 38' of the housing 22' of the light head 14'.

FIGS. 19-27 illustrate the task light 10' in a variety of configuration and coupled to a variety of support structures. The illustrated configurations are not limiting and can be equally applied to the task light 10 of FIGS. 1-18.

FIG. 19 illustrates an extended configuration of the task light 10' similar to the third extended configuration of the task light 10 shown in FIG. 7. The extended configuration may be referred to as a standing configuration. The first leg 106' is rotated about the connector axis 70' away from the second leg 110', and the cross beams 122' engage a support surface to support the light head 14' above the surface. The light head 14 is illustrated as rotated slightly sideways. The light head 14' is also illustrated as spaced from the legs 106', 110' about the connector axis 70' so that the light head 14' is positioned opposite rather than between the first leg 106' and the second leg 110'.

FIG. 20 illustrates an extended configuration similar to the first extended configuration of the task light 10 shown in FIG. 2. The light head 14' is rotated away from the support frame 18' by less than 90 degrees. The light head 14' is positioned on a support surface so that light is emitted generally upward, away from the support surface.

Figure 21:
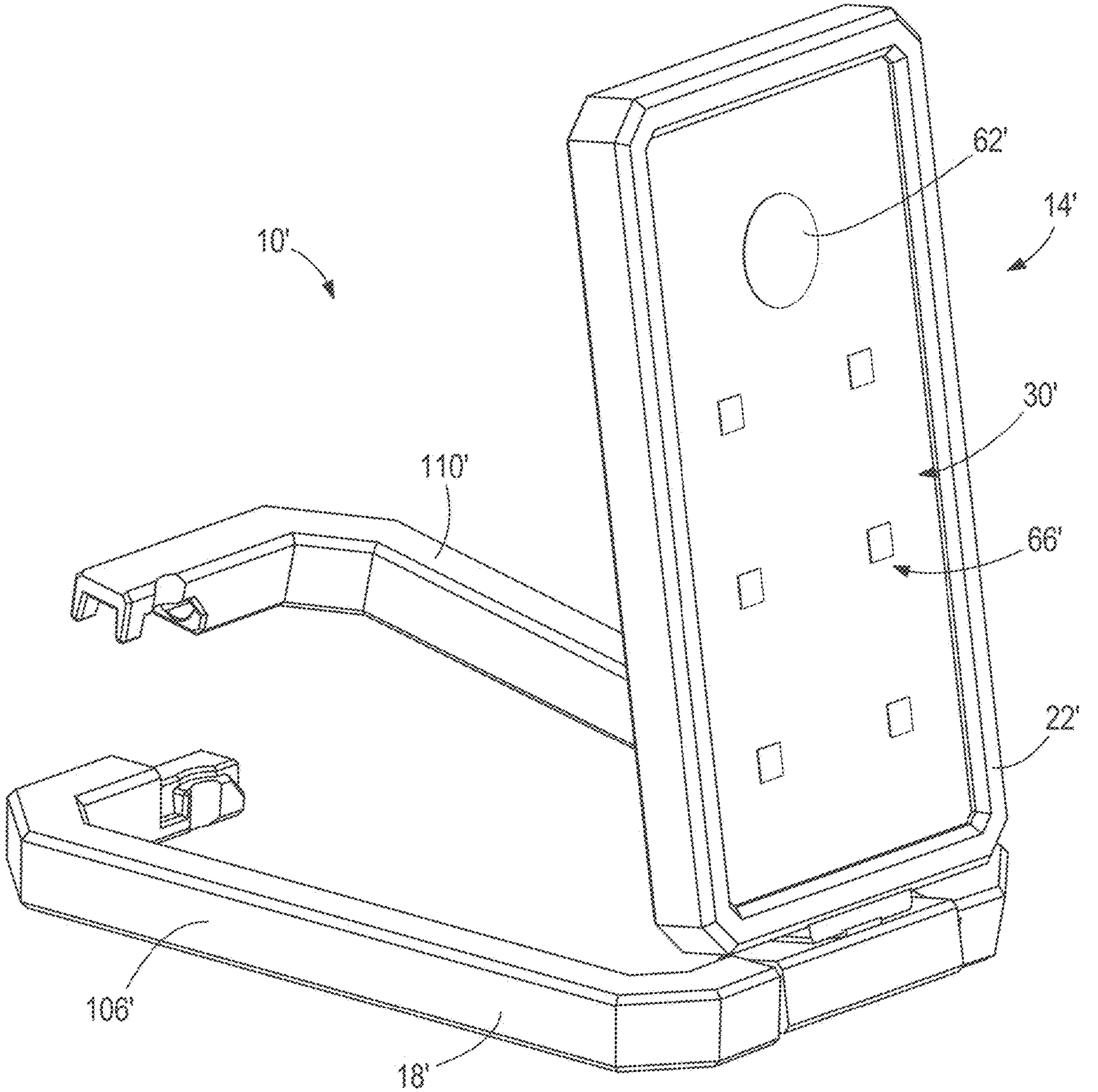
FIG. 21 is a front perspective view of the task light of FIG. 19 in another extended configuration.

FIG. 21 illustrates an additional extended configuration of the task light 10' that may also be called a broken extended configuration. One of the legs 106', 110' (e.g., the first leg 106') is engaged with a support surface along the length thereof, and the other of the legs 106', 110' (e.g., the second leg 110') is lifted from the support surface. The light head 14 is rotated away from the support frame 18. In the illustrated embodiment, the first leg 106' engages the surface and is spaced from the light head 14' by less than 90 degrees. Light is emitted generally upward, away from the support surface.

Figure 22:
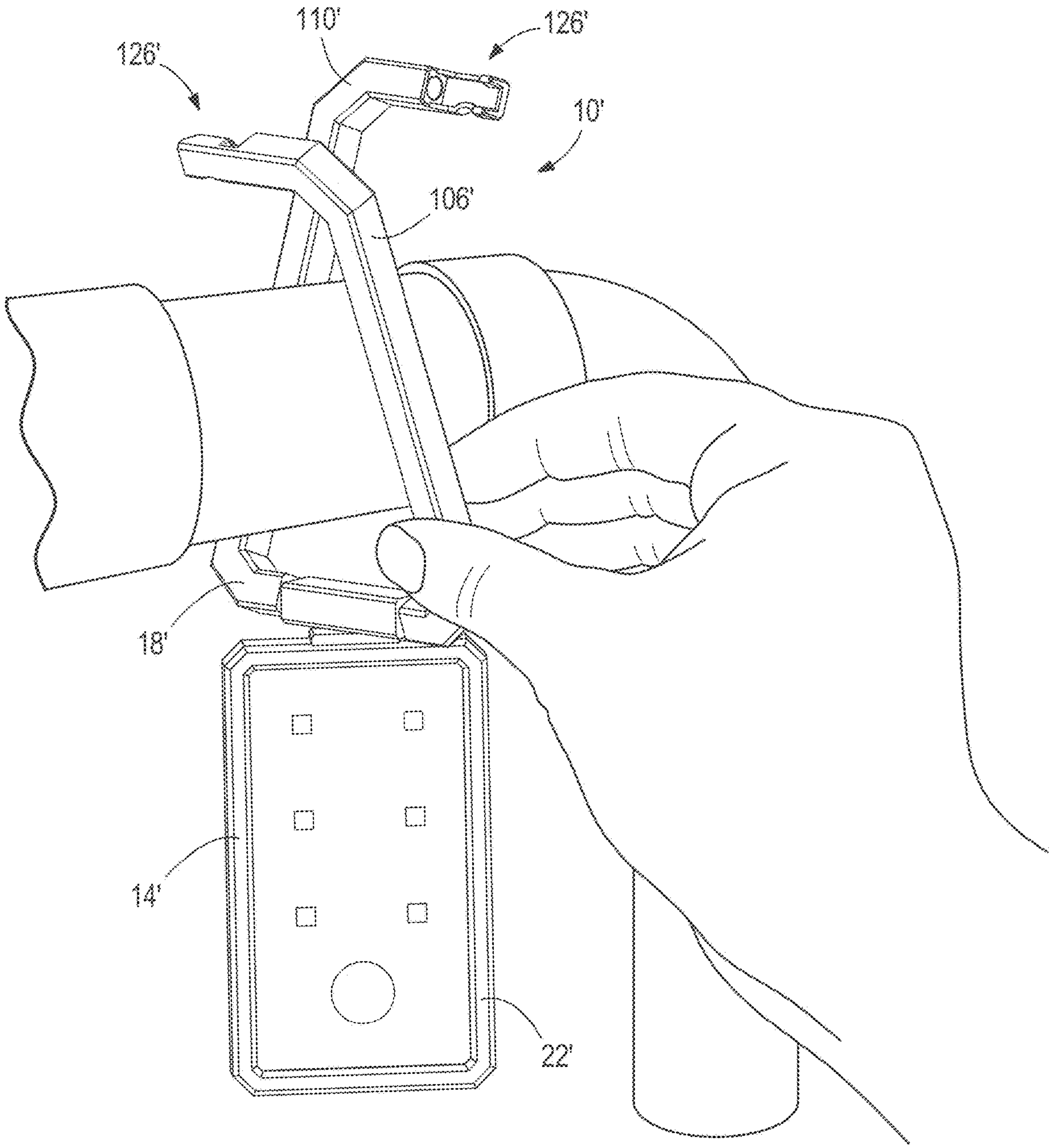
FIG. 22 is a perspective view of the task light of FIG. 19 coupled to a support structure (e.g., a pipe, beam, etc.).

FIG. 22 illustrates an operator coupling the task light 10' in a first hanging configuration. The task light 10' is coupled to a support beam by separating the first leg 106' from the second leg 110' (e.g., rotating the legs 106', 110' away from each other) to create a gap between the cross beams 122. The task light 10' may be positioned as shown in FIG. 22 with the legs 106', 110' on either side of the support beam. In some embodiments, the inside corner between the leg body 116' and the cross beam 122' may be used to support (e.g., hang) the task light 10'. In other embodiments, the legs 106', 110' are reconnected to surround the center receiving area 130' while the support beam is received in the center receiving area 130'. The light head 14' can be rotated about the longitudinal axis 26' and connector axis 70' to direct the emitted light.

FIG. 23, as discussed above, illustrates a notch 176' used to hang the task light 10' on a support rod such as a nail, screw, hook, pipe end, etc. The support frame 18 can be positioned so the support rod extends through the center receiving area 130. The task light 10' can then be rested with the support rod positioned in the notch 176' to inhibit movement of the task light 10' relative to the support rod.

Figure 24:
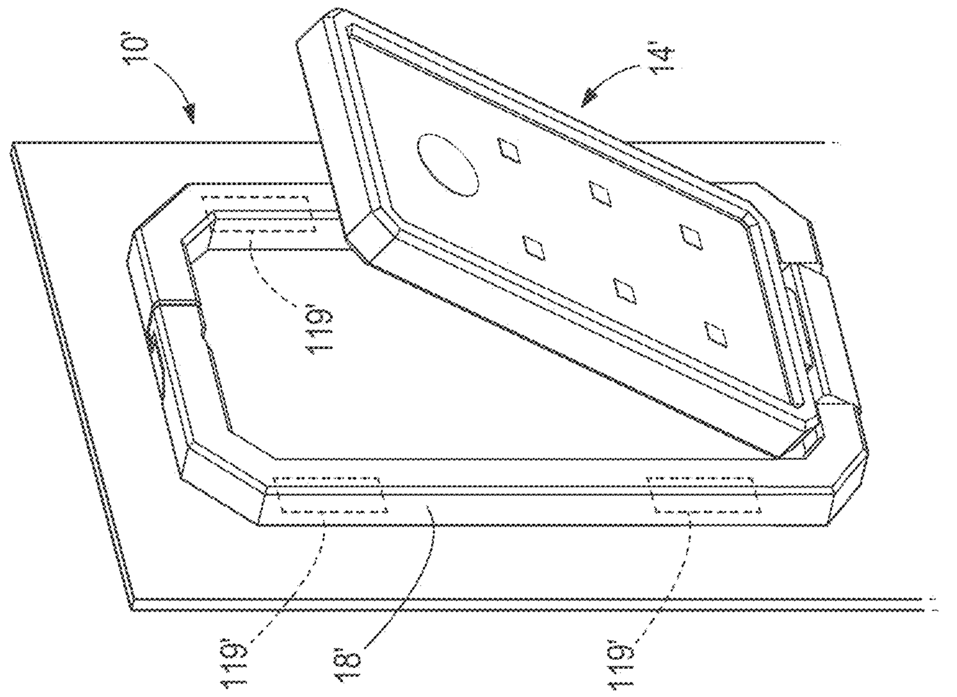
FIG. 24 is a perspective view of the task light of FIG. 19 supported on another support structure (e.g., a vertical surface) via magnets.

FIG. 24 illustrates the task light 10' supported on a ferromagnetic surface by the magnets 119' in the support frame 18'. As described in reference to the task light 10, the magnets 119' are coupled to the leg bodies 116 of the support frame 18. In other embodiments, the magnets 119' may be alternately or additionally positioned in other places on the support frame 18' or may be positioned on the light head 14'. In the illustrated embodiment, the magnets 119' support the task light 10 on a vertical surface and the light head 14' rotates with respect to the support frame 18' to direct the emitted light.

Figure 25:
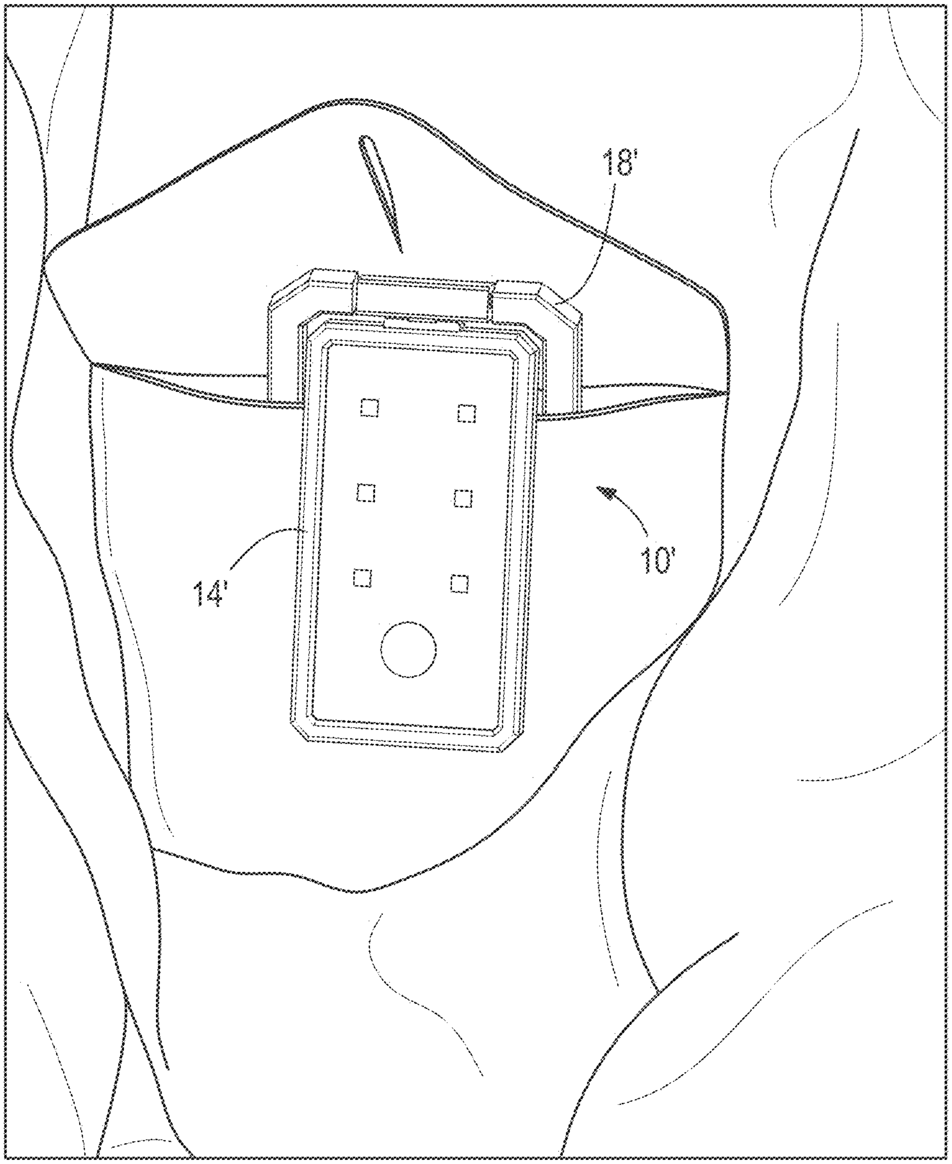
FIG. 25 illustrates the task light of FIG. 19 in a pocket of an operator.

FIG. 25 illustrates a clamping position of the task light 10' in which the support frame 18' and light head 14' are positioned on opposite sides of a surface, such as a pocket, a pouch, a strap, a belt, etc. The surface is pressed between the light head 14' and the support frame 18' to generally support the light head 14' to emit light, for example, in front of a user that follows with the user.

Figure 26:
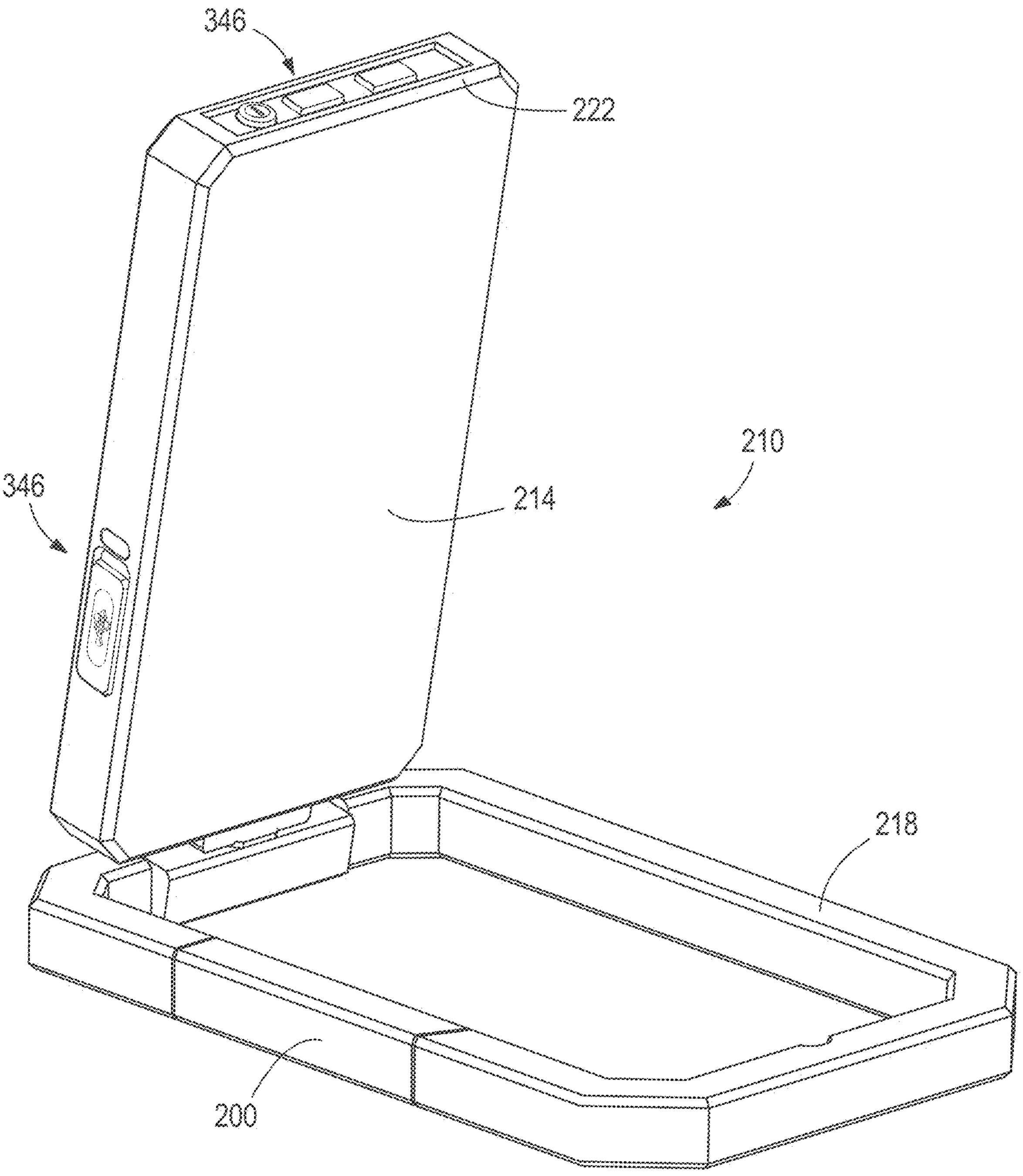
FIG. 26 is a perspective view of a third embodiment of a task light including a clip style support frame.

FIG. 26 illustrates an alternate embodiment of a task light 210 including a support frame 218 with a carabiner link 200. The support frame 218 is not divided into separately rotatable legs and, instead, rotates as a unit with respect to the light head 14. Additionally, the task light 210 includes an alternate user interface 346 positioned the housing 222.

Embodiments disclosed herein are primarily for exemplary purposes. It should be understood that alternative embodiments or various combinations of features described herein may be implemented.

Various features and advantages of the embodiments described herein are set forth in the following claims.

What is claimed is:

1. A lighting device comprising:

a connector body defining a first axis and a second axis;

a light head rotatably coupled to the connector body for rotation about the first axis, the light head including a housing and a light source supported by the housing;

a first leg rotatably coupled to the connector body for rotation about the second axis, the first leg extending to a first distal end; and a second leg rotatably coupled to the connector body for rotation about the second axis independent from the first leg, the second leg extending to a second distal end;

wherein the first distal end of the first leg removably engages the second distal end of the second leg, and wherein the first leg and the second leg are configurable to support the light head.

2. The lighting device of claim 1, wherein the first distal end includes a first connection interface, and wherein the second distal end includes a second connection interface configured to engage the first connection interface to couple the first leg to the second leg.

3. The lighting device of claim 2, wherein when the first connection interface engages the second connection interface the first leg and the second leg rotate together about the second axis.

4. The lighting device of claim 1, wherein the connector body includes a first post defining the first axis and configured to be received in a first opening in the housing of the light head.

5. The lighting device of claim 4, wherein the light head is configured to rotated about the first axis relative to the first post more than 360 degrees.

6. The lighting device of claim 1, wherein the light head extends along the first axis between a proximal end and a distal end, and wherein the proximal end is coupled to the connector body.

7. The lighting device of claim 6, wherein the lighting device is movable between a compact configuration, in which the first leg is coupled to the second leg and the first distal end and the second distal end are adjacent the distal end of the light head.

8. The lighting device of claim 6, wherein the lighting device is movable to a standing configuration, in which the first leg is offset from the second leg and the first distal end and the second distal end each engage a support surface to support the lighting device.

9. A lighting device comprising:

a light head including a housing and a light source; and a support frame rotatably coupled to the light head and configured to support the light head, the support frame including a first leg extending to a first distal end, a second leg extending to a second distal end, the second distal end being removably coupled to the first distal end, and a receiving area defined between the first leg and the second leg;

wherein in a first configuration, the light head is positioned in the receiving area, and in a second configuration, the receiving area is configured to receive a support structure;

wherein the first leg includes a first base end opposite the first distal end and coupled to the light head for rotation about an axis, and wherein the second leg includes a second base end opposite the second distal end and coupled to the light head for rotation about the axis independent from the first leg.

10. The lighting device of claim 9, wherein in a third configuration, the first distal end of the first leg is separated from the second distal end of the second leg.

11. The lighting device of claim 9, wherein the first distal end includes a first connection interface, wherein the second distal end includes a second connection interface, and wherein the first connection interface and the second connection interface are engageable to couple the first leg with the second leg for rotation together.

12. The lighting device of claim 11, wherein the first connection interface includes a first magnet and the second connection interface includes a second magnet, and wherein the first magnet and the second magnet selectively couple the first leg and the second leg together.

13. The lighting device of claim 12, wherein the first connection interface also includes a tab and the second connection interface also includes a groove, and wherein the tab engages the groove to align the first magnet and the second magnet.

14. The lighting device of claim 9, wherein the support frame includes a magnet, and wherein in a fourth configuration, the lighting device is supported on a ferromagnetic support surface by the magnet.

15. The lighting device of claim 9, further comprising a user interface positioned on the housing of the light head.

16. The lighting device of claim 15, wherein when the lighting device is in the first configuration, the user interface is at least partially accessible.

17. The lighting device of claim 9, further comprising:

a battery positioned within the housing of the light head; and a charging interface on the light head, the charging interface configured to couple to an external power source to provide power to recharge the battery.

18. A lighting device comprising:

a connector body defining a first axis and a second axis;

a light head coupled to the connector body for rotation about the first axis, the light head including a housing defining an outermost perimeter of the light head and a light source supported by the housing; and a support frame coupled to the connector body for rotation about the second axis, the support frame configured to support the light head and defining a receiving area;

wherein the light head is rotatable relative to the support frame between a first position, in which the light head is positioned in the receiving area, and a second position, in which the light head is moved out of the receiving area;

wherein the outermost perimeter of the light head is surrounded by the support frame when the light head is in the first position; and wherein the support frame includes a first leg coupled to the connector body for rotation about the second axis, and a second leg coupled to the connector body for rotation about the second axis, independent from rotation of the first leg.

* * * * *